US012747962B2

(12) United States Patent
Ozog et al.

(10) Patent No.: US 12,747,962 B2
(45) Date of Patent: Sep. 29, 2026

(54) PRODUCING, FROM DATA AFFILIATED WITH IMAGES OF A LOCATION, BUT EXCLUDING PIXEL COLOR DATA, A DIGITAL MAP OF THE LOCATION

(71) Applicant: Woven by Toyota, Inc., Tokyo (JP)

(72) Inventors: Paul J. Ozog, Ann Arbor, MI (US); Chong Zhang, Burr Ridge, IL (US); Hai Jin, Fremont, CA (US); Yucong Lin, Ann Arbor, MI (US); Mohammed D. Aladem, Ypsilanti, MI (US); Matthew W. Dreisbach, Ann Arbor, MI (US)

(73) Assignee: Woven By Toyota, Inc., Tokyo (JP)

( * ) Notice: Subject to any disclaimer, the term of this patent is extended or adjusted under 35 U.S.C. 154(b) by 367 days.

(21) Appl. No.: 18/455,039

(22) Filed: Aug. 24, 2023

(65) Prior Publication Data

US 2025/0067574 A1 Feb. 27, 2025

(51) Int. Cl.
*G01C 21/00* (2006.01)
*B60W 60/00* (2020.01)
(Continued)

(52) U.S. Cl.
CPC ....... *G01C 21/3833* (2020.08); *B60W 60/001* (2020.02); *G01C 21/3807* (2020.08);
(Continued)

(58) Field of Classification Search
CPC ............ G01C 21/3833; G01C 21/3807; G01C 21/3848; B60W 60/001; B60W 2556/40;
(Continued)

(56) References Cited

U.S. PATENT DOCUMENTS 10,281,285 B2 5/2019 Chen et al.
11,367,208 B2 * 6/2022 Zhang ................ G01C 21/3837
(Continued)

FOREIGN PATENT DOCUMENTS

CN 111105695 A 5/2020
JP 2021111385 A 8/2021
WO 2022197544 A1 9/2022

OTHER PUBLICATIONS

Ros et al. "Vision-based Offline-Online Perception Paradigm for Autonomous Driving," 2015 IEEE Winter Conference on Applications of Computer Vision. IEEE, 2015, pp. 231-238.
(Continued)

*Primary Examiner* — Peter D Nolan
(74) *Attorney, Agent, or Firm* — Christopher G. Darrow; Darrow Mustafa PC

(57) ABSTRACT

A system for producing, from data affiliated with images of a location, a digital map can include a processor and a memory. The memory can store a productions module and a communications module. The production module can include instructions that cause the processor to produce, from the data affiliated with the images of the location, the digital map. The data, for an image, can exclude pixel color data, but can include information about: (1) a pose of a camera that produced the image and (2) one or more of a position of a point on: (a) a lane boundary of a lane of a road in the image, (b) a road boundary of the road, or (c) a landmark in the image. The communications module can include instructions that cause the processor to transmit the digital map to a vehicle to be used to control a movement of the vehicle.

20 Claims, 23 Drawing Sheets

1500

(51) Int. Cl.
*G06V 20/10* (2022.01)
*G06V 20/40* (2022.01)
*G06V 20/56* (2022.01)

(52) U.S. Cl.
CPC ............ *G06V 20/182* (2022.01); *G06V 20/46* (2022.01); *G06V 20/56* (2022.01); *B60W 2556/40* (2020.02); *B60W 2556/50* (2020.02)

(58) Field of Classification Search
CPC . B60W 2556/50; G06V 20/182; G06V 20/46; G06V 20/56; G06V 20/582; G06V 20/588
See application file for complete search history.

(56) References Cited

U.S. PATENT DOCUMENTS

| | | | | |
|---|---|---|---|---|
| 12,260,574 | B2 * | 3/2025 | Zhang | G01S 17/931 |
| 2019/0156128 | A1 * | 5/2019 | Zhang | G08G 1/167 |
| 2020/0098135 | A1 | 3/2020 | Ganjineh et al. | |
| 2020/0109954 | A1 * | 4/2020 | Li | G01C 21/3848 |
| 2020/0410702 | A1 * | 12/2020 | Zhang | G06T 7/521 |
| 2023/0018923 | A1 * | 1/2023 | Zhang | G01S 17/931 |
| 2023/0334696 | A1 * | 10/2023 | Wang | G06T 7/337 |

OTHER PUBLICATIONS

Kümmerle et al. "Large Scale Graph-based SLAM using Aerial Images as Prior Information," Autonomous Robots vol. 30, 2011, pp. 25-39.
Costea et al. "Aerial image geolocalization from recognition and matching of roads and intersections," arXiv preprint arXiv:1605.08323, 2016, pp. 1-6.
Newman et al. "Outdoor SLAM using visual appearance and laser ranging," Proceedings 2006 IEEE International Conference on Robotics and Automation, 2006, ICRA, IEEE, 2006, pp. 1180-1187.
Murciego et al. "Topological road mapping for autonomous driving applications," Advances in Physical Agents: Proceedings of the 19th International Workshop of Physical Agents, Nov. 2018, Springer International Publishing, pp. 257-270.
Pauls et al. "Monocular localization in hd maps by combining semantic segmentation and distance transform," 2020 IEEE/RSJ International Conference on Intelligent Robots and Systems (IROS), Las Vegas, NV, USA, pp. 4595-4601.
PJ Toivanen, "New geodosic distance transforms for gray-scale images," Pattern Recognition Letters, vol. 17, Issue 5, May 1996, pp. 437-450.
Sigg et al. "Signed distance transform using graphics hardware," IEEE Visualization, VIS 2003, Seattle, WA, USA, pp. 83-90.
Unknown, "Scale-invariant feature transform," Last edited May 20, 2023, 19 pages, found at https://en.wikipedia.org/wiki/Scale-invariant_feature_transform.
Unknown, "Bundle adjustment," Last edited Jun. 26, 2023, 3 pages, found at https://en.wikipedia.org/wiki/Bundle_adjustment.
Unknown, "Correspondence problem," Last edited Dec. 10, 2022, 3 pages, found at https://en.wikipedia.org/wiki/Correspondence_problem.
Unknown, "Road surface marking," Last edited on Jul. 9, 2023, 24 pages, found at https://en.wikipedia.org/wiki/Road_surface_marking.
Unknown, "Traffic-sign recognition," Last edited on Jul. 26, 2023, 4 pages, found at https://en.wikipedia.org/wiki/Traffic-sign_recognition.
Unknown, "Traffic sign," Last edited on Jul. 16, 2023, 10 pages, found at https://en.wikipedia.org/wiki/Traffic_sign.
Unknown, "Floating car data," Last edited on Jun. 26, 2023, 3 pages, found at https://en.wikipedia.org/wiki/Floating_car_data.
Piotr Duszak, "SLAM on the Hexagonal Grid," Sensors 2022, vol. 22, Apr. 29, 2022, pp. 6221-6235.
David G. Lowe, "Object Recognition from Local Scale-Invariant Features," Proceedings of the Seventh IEEE International Conference on Computer Vision, Sep. 1999, pp. 1150-1157.
Tian et al., "D2D: Keypoint Extraction with Describe to Detect Approach," Computer Vision—ACCV 2020, Feb. 2021, pp. 223-240.
Royer et al., "Outdoor autonomous navigation using monocular vision," Dec. 5, 2006, pp. 1-7, found at https://hal.science/hal-00118546.
Younes et al., "Keyframe-based monocular SLAM: design, survey, and future directions," Jul. 2, 2016, pp. 1-25, found at arxiv.org/abs/1607.00470.
Li et al., "Semantic Optimization of Feature-Based SLAM," Mathematical Problems in Engineering, vol. 2021, Jan. 30, 2021, pp. 1-10.
Buckel et al., "Virtual Validation Platform for AD/ADAS Systems using Kempten Digital City," ASAM SIM: Guide-Standardization for Highly Automated Driving, Mar. 2021, pp. 70-71.
Xiao et al., "Monocular Localization with Vector HD Map (MLVHM): A Low-Cost Method for Commercial IVs," Sensors 2020, vol. 20, Feb. 9, 2020, pp. 1870-1893.
He et al., "Mapping to cells: a simple method to extract traffic dynamics from probe vehicle data," Computer-Aided Civil and Infrastructure Engineering, vol. 32, No. 3, Mar. 2017, pp. 252-267.
Unknown et al., "TomTom, Toyota Research Institute—Advanced Development, Inc. and DENSO Collaborate on Advanced Mapmaking for Automated Driving," Mar. 10, 2020, 2 pages, found at https://www.cnet.com/roadshow/news/toyota-carmera-safety-cameras-hd-maps-self-driving-cars/.
Andrew Krok, "Toyota, Carmera will create HD maps for self-driving cars using autobrake cameras," CNET, Feb. 28, 2019, 15 pages, found at cnet.com/roadshow/news/toyota-carmera-safety-cameras-hd-maps-self-driving-cars/.
Kirsten Korosec, "Toyota's Woven Planet acquires HD mapping startup Carmera," TechCrunch, Jul. 14, 2021, 11 pages, found at techcrunch.com/2021/07/14/toyotas-woven-planet-acquires-hd-mapping-startup-carmera/.
Unknown, "TRI-AD demonstrates successful creation of HD maps for automated driving on surface roads using two techniques," Green Car Congres—Energy, technologies, issues and policies for sustainable mobility, Mar. 10, 2020, 13 pages, found at greencarcongress.com/2020/03/20200310-triad.html.
Unknown, Developer's Guide—HERE Probe Data—HERE Developer, 4 pages, found at developer.here.com/documentation/traffic-probe-data/dev_guide/index.html.
Zubizarreta et al., "Direct Sparse Mapping," IEEE Transactions on Robotics, vol. 36, No. 4, Aug. 2020, pp. 1363-1370.
Eade et al., "Edge Landmarks in Monocular SLAM," Image and Vision Computing, vol. 27, No. 5, Apr. 2, 2009, pp. 588-596.
Ling et al., "Building Maps for Autonomous Navigation Using Sparse Visual SLAM Features," 2017 IEEE/SJ International Conference on Intelligent Robots and Systems (IROS), 2017, pp. 1374-1381.
Chen et al., "An Overview on Visual SLAM: From Tradition to Semantic," Remote Sensing, vol. 14, No. 13, Jun. 2022, pp. 3010-3056.
Matsuki et al., "CodeMapping: Real-Time Dense Mapping for Sparse SLAM using Compact Scene Representations," IEEE Robotics and Automation Letters, vol. 6, Jul. 19, 2021, pp. 7105-7112.
Mur-Artal et al., "ORB-SLAM: a Versatile and Accurate Monocular SLAM System," IEEE Transactions on Robotics, vol. 31, No. 5, Oct. 2015, pp. 1147-1163.
Engel et al., "LSD-SLAM: Large-Scale Direct Monocular SLAM," European Conference on Computer Vision, 2014, pp. 1016.
Klein et al., "Parallel Tracking and Mapping for Small AR Workspaces," 2007 6th IEEE and ACM International Symposium on Mixed and Augmented Reality, 2007, pp. 225-234.
Alismail et al., "Photometric Bundle Adjustment for Vision-Based SLAM," Aug. 5, 2016, pp. 1-20, found at https://arxiv.org/abs/1608.02026.

* cited by examiner

600

602

| | |
|---|---|
| 610 | camera (latitude: 37.441866, longitude: -122.143121, altitude: 10.67), (roll: 3.17 degrees, pitch: 2.58 degrees, yaw: +3.29 degrees) |
| 402 | sign_type: no_parking, sign_center: (latitude: 37.441908, longitude: -122.143097, altitude: 11.15), sign_width: 0.30m, sign_height: 0.30m) |
| 404 | sign_type: speed_limit_25, sign_center: (latitude: 37.441888, longitude: -122.143097, altitude: 11.15), sign_width: 0.30m, sign_height: 0.45m) |
| 406 | road_boundary: (latitude: 37.441887, longitude: -122.143221, altitude: 9.15) |
| 408 | road_boundary: (latitude: 37.441887, longitude: -122.143101, altitude: 9.15) |
| 410 | lane_boundary: (latitude: 37.441887, longitude: -122.143181, altitude: 9.15) |
| 412 | lane_boundary: (latitude: 37.441989, longitude: -122.143141, altitude: 9.15) |
| 414 | lane_boundary: (latitude: 37.441884, longitude: -122.143141, altitude: 9.15) |
| 416 | road_boundary: (latitude: 37.441911, longitude: -122.143094, altitude: 9.15) |

$t_1$

604

| | |
|---|---|
| 612 | camera (latitude: 37.441873, longitude: -122.143121, altitude: 10.61), (roll: 2.64 degrees, pitch: 1.95 degrees, yaw: +3.13 degrees) |
| 402 | sign_type: no_parking, sign_center: (latitude: 37.441907, longitude: -122.143097, altitude: 11.09), sign_width: 0.30m, sign_height: 0.30m) |
| 502 | road_boundary: (latitude: 37.441894, longitude: -122.143221, altitude: 9.09) |
| 504 | road_boundary: (latitude: 37.441894, longitude: -122.143101, altitude: 9.09) |
| 506 | lane_boundary: (latitude: 37.441894, longitude: -122.143181, altitude: 9.09) |
| 412 | lane_boundary: (latitude: 37.441988, longitude: -122.143141, altitude: 9.09) |
| 416 | road_boundary: (latitude: 37.441910, longitude: -122.143094, altitude: 9.09) |
| 508 | lane_boundary: (latitude: 37.441938, longitude: -122.143094, altitude: 9.09) |

$t_2$

FIG. 6A

600

606

| | |
|---|---|
| 614 | camera (latitude: 37.441861, longitude: -122.143123, altitude: 10.57), (roll: 4.36 degrees, pitch: 3.85 degrees, yaw: -3.36 degrees) |
| 402 | sign_type: no_parking, sign_center: (latitude: 37.441903, longitude: -122.143099, altitude: 11.05), sign_width: 0.30m, sign_height: 0.30m) |
| 404 | sign_type: speed_limit_25, sign_center: (latitude: 37.441886, longitude: -122.143099, altitude: 11.05), sign_width: 0.30m, sign_height: 0.45m) |
| 406 | road_boundary: (latitude: 37.441882, longitude: -122.143223, altitude: 9.05) |
| 408 | road_boundary: (latitude: 37.441882, longitude: -122.143103, altitude: 9.05) |
| 410 | lane_boundary: (latitude: 37.441882, longitude: -122.143183, altitude: 9.05) |
| 412 | lane_boundary: (latitude: 37.441992, longitude: -122.143143, altitude: 9.05) |
| 414 | lane_boundary: (latitude: 37.441887, longitude: -122.143143, altitude: 9.05) |
| 416 | road_boundary: (latitude: 37.441911, longitude: -122.143098, altitude: 9.05) |

$t_3$

608

| | |
|---|---|
| 616 | camera (latitude: 37.441872, longitude: -122.143122, altitude: 10.63), (roll: 3.47 degrees, pitch: 2.84 degrees, yaw: -3.13 degrees) |
| 402 | sign_type: no_parking, sign_center: (latitude: 37.441889, longitude: -122.143098, altitude: 11.11), sign_width: 0.30m, sign_height: 0.30m) |
| 502 | road_boundary: (latitude: 37.441893, longitude: -122.143222, altitude: 9.11) |
| 504 | road_boundary: (latitude: 37.441893, longitude: -122.143102, altitude: 9.11) |
| 506 | lane_boundary: (latitude: 37.441893, longitude: -122.143182, altitude: 9.11) |
| 412 | lane_boundary: (latitude: 37.441995, longitude: -122.143142, altitude: 9.11) |
| 416 | road_boundary: (latitude: 37.441909, longitude: -122.143093, altitude: 9.11) |
| 508 | lane_boundary: (latitude: 37.441937, longitude: -122.143095, altitude: 9.11) |

$t_4$

FIG. 6B

PRODUCING, FROM DATA AFFILIATED WITH IMAGES OF A LOCATION, BUT EXCLUDING PIXEL COLOR DATA, A DIGITAL MAP OF THE LOCATION

TECHNICAL FIELD

The disclosed technologies are directed to producing, from data affiliated with images of a location, but excluding pixel color data, a digital map of the location.

BACKGROUND

A digital map can be an electronic representation of a conventional paper road map. For example, an automotive navigation system can use information received from a digital map and information received from a global navigation satellite system (GNSS) to produce a turn-by-turn navigation service. A turn-by-turn navigation service can provide a route between an origination point and a destination point. A position of a vehicle determined by such a turn-by-turn navigation service can be within a meter of an actual position.

More recently, technologies have been developed to automate one or more operations of one or more vehicle systems to control a movement of a vehicle. Such technologies can use information received from a digital map to control such movement. However, such a digital map can be required to indicate positions of objects with a degree of accuracy that is within a decimeter. Accordingly, development of technologies to automate control of movement of vehicles have been accompanied by efforts to improve the degree of accuracy of digital maps. This has led to the production of high-definition (HD) maps.

An HD map can be a digital map that includes additional information to improve the degree of accuracy required to automate control of a movement of a vehicle. An HD map can be characterized as having layers of additional information. Each layer of additional information can be affiliated with a specific category of additional information. These layers can include, for example, a layer of a base map, a layer of a geometric map, and a layer of a semantic map. The base map, the geometric map, and the semantic map can include information about static aspects of a location.

The geometric map can be produced, for example, using a simultaneous localization and mapping (SLAM) technique. A SLAM technique can use proprioception information to estimate a pose (i.e., a position and an orientation) of a vehicle, and perceptual information to correct an estimate of the pose. Usually, the proprioception information can be one or more of GNSS information, inertial measurement unit (IMU) information, odometry information, or the like. For example, the odometry information can be a value included in a signal sent to a vehicle system (e.g., an accelerator). The perceptual information can often be one or more of point cloud information from a ranging sensor (e.g., a light detection and ranging (lidar) system), image data from one or more images from one or more image sensors or cameras, or the like. The geometric map can include, for example, a ground map of improved surfaces for use by vehicles and pedestrians (e.g., drivable surfaces (e.g., roads)), and voxelized geometric representations of three-dimensional objects at the location.

The semantic map can include semantic information about objects included at the location. The objects can include, for example, landmarks. A landmark can be, for example, a feature that can be easily re-observed and distinguished from other features at the location. The term landmark, in a context of indicating positions of objects with a degree of accuracy that is within a decimeter, can be different from a conventional use of the term landmark. For example, landmarks can include lane boundaries, road boundaries, intersections, crosswalks, bus lanes, parking spots, signs, signs painted on roads, traffic lights, or the like.

Because an HD map can be used to control a movement of a vehicle, not only do positions of objects need to be indicated on the HD map with a high degree of accuracy, but also the HD map can be required to be updated at a high rate to account for changes in objects or positions of objects expected to be indicated on the HD map.

SUMMARY

In an embodiment, a system for producing, from data affiliated with images of a location, a digital map can include a processor and a memory. The memory can store a productions module and a communications module. The production module can include instructions that, when executed by the processor, cause the processor to produce, from the data affiliated with the images of the location, the digital map. The data, for an image, can exclude pixel color data, but can include information about: (1) a pose of a camera that produced the image and (2) one or more of a position of a point on: (a) a lane boundary of a lane of a road in the image. (b) a road boundary of the road, or (c) a landmark in the image. The communications module can include instructions that, when executed by the processor, cause the processor to transmit the digital map to a vehicle to be used to control a movement of the vehicle.

In another embodiment, a method for producing, from data affiliated with images of a location, a digital map can include producing, by a processor and from the data affiliated with the images of the location, the digital map. The data, for an image, can exclude pixel color data, but can include information about: (1) a pose of a camera that produced the image and (2) one or more of a position of a point on: (a) a lane boundary of a lane of a road in the image. (b) a road boundary of the road, or (c) a landmark in the image. The method can include transmitting, by the processor, the digital map to a vehicle to be used to control a movement of the vehicle.

In another embodiment, a non-transitory computer-readable medium for producing, from data affiliated with images of a location, a digital map can include instructions that, when executed by one or more processors, cause the one or more processors to produce, from the data affiliated with the images of the location, the digital map. The data, for an image, can exclude pixel color data, but can include information about: (1) a pose of a camera that produced the image and (2) one or more of a position of a point on: (a) a lane boundary of a lane of a road in the image, (b) a road boundary of the road, or (c) a landmark in the image. The non-transitory computer-readable medium can include instructions that, when executed by the one or more processors, transmit the digital map to a vehicle to be used to control a movement of the vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 6A and 6B include an example of tables that illustrate data affiliated with images of a location, according to the disclosed technologies.

DETAILED DESCRIPTION

Figure 1:
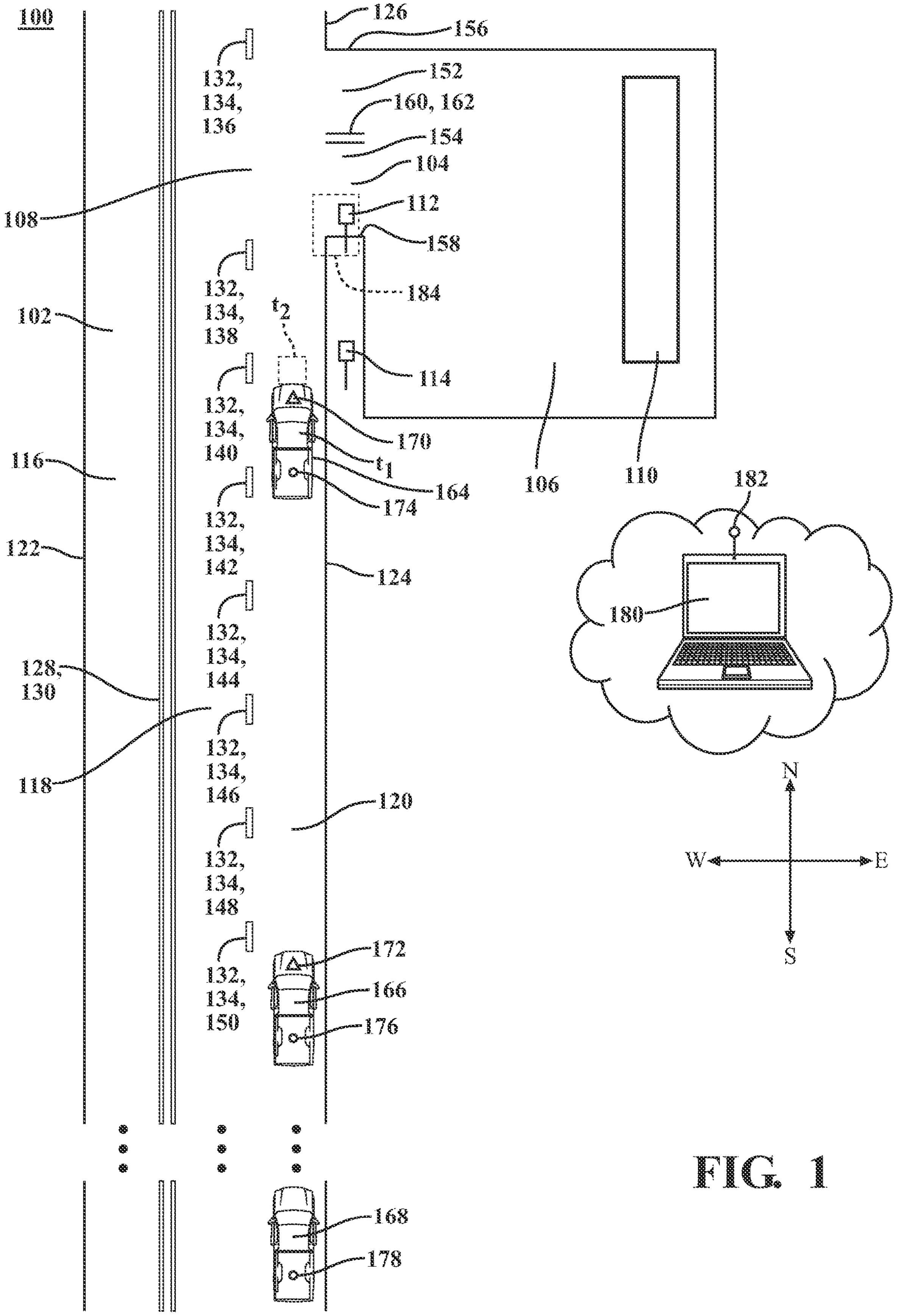
FIG. 1 includes a diagram that illustrates an example of an environment for producing, from data affiliated with images of a location, but excluding pixel color data, a digital map of the location, according to the disclosed technologies.

Simultaneous localization and mapping (SLAM) is a phrase that can refer to a technology that enables a mobile robot (e.g., an automated vehicle or an autonomous vehicle) to move through an unknown location while simultaneously determining a pose (i.e., a position and an orientation) of the vehicle at the location (i.e., localization) and mapping the location. Typically, a SLAM technique can operate over discrete units of time and use proprioception information to estimate a pose of the vehicle, and perceptual information to correct an estimate of the pose. Usually, the proprioception information can be one or more of global navigation satellite system (GNSS) information, inertial measurement unit (IMU) information, odometry information, or the like. For example, the odometry information can be a value included in a signal sent to a vehicle system (e.g., an accelerator). The perceptual information can often be one or more of point cloud information from a ranging sensor (e.g., a light detection and ranging (lidar) system), image data from one or more images from one or more image sensors or cameras, or the like.

For example, for a SLAM technique that uses point cloud information from a ranging sensor, the ranging sensor can provide the vehicle with distances and bearings to objects in the location and the SLAM technique can operate to identify salient objects as landmarks. For example, for a SLAM technique that uses image data from one or more images from one or more image sensors or cameras, which can be referred to as visual SLAM, distances and bearings to objects can be determined using a photogrammetric range imaging technique (e.g., a structure from motion (SfM) technique) applied to a sequence of two-dimensional images. Because a camera can be less expensive than a lidar device and more vehicles are equipped with cameras than with lidar devices, considerable effort has been expended to develop visual SLAM for use in producing geometric maps as layers of high-definition (HD) maps used to control movements of vehicles.

Moreover, although SLAM techniques were originally developed to operate in real-time (i.e., simultaneously localize and map), the use of SLAM techniques to produce geometric maps has led to the development of SLAM techniques that can operate in a setting other than in a moving vehicle. In such SLAM techniques, recordings of the proprioception information and the perceptual information can be used. Such SLAM techniques can be referred to as offline SLAM. By using the recordings of the proprioception information and the perceptual information, corrections to estimates of poses of a vehicle can be performed concurrently on one or more finite sequences of the discrete units of time over which the SLAM techniques were operated. Such corrections can be realized by various procedures, which can include, for example, one or more techniques for optimization. An optimization can result in more accurate corrections to the estimates of the poses of the vehicle if one or more objects included in the recordings of the perceptual information are included in a plurality of instances of the recordings. (Such a situation can be referred to as closing the loop.) That is, corrections to the estimates of the poses of the vehicle can be more accurate for an optimization in which the same object is included in the recordings of the perceptual information in a plurality of instances than for an optimization in which the same object is not included in the recordings of the perceptual information in a plurality of instances.

The recordings of the proprioception information and the perceptual information can be obtained, for example, by one or more probe vehicles. A probe vehicle can be a vehicle that intentionally performs one or more passes through a location to obtain the recordings of the proprioception information and the perceptual information. Moreover, during each pass, of the one or more passes, a plurality of instances of recordings of the proprioception information and the perceptual information can be obtained. Having: (1) a probe vehicle obtain, during a pass through a location, a plurality of instances of recordings of the proprioception information and the perceptual information, (2) a plurality of probe vehicles pass through a location, or (3) both can increase a likelihood that one or more objects included in the recordings of the perceptual information are included in the plurality of instances of the recordings so that results of an optimization will include a situation of closing the loop.

Because an HD map can be used to control a movement of a vehicle, inclusion of indications of certain objects (e.g., landmarks) on the HD map can be more important than others. Such important landmarks can include, for example, lane boundaries, road boundaries, intersections, crosswalks, bus lanes, parking spots, signs, signs painted on roads, traffic lights, or the like. The disclosed technologies are directed to producing, from data affiliated with images of a location, a digital (e.g., HD) map of the location. The digital map can be produced from the data affiliated with the images. The data, for an image of the images, can exclude pixel color data, but can include information about: (1) a pose of a camera that produced the image and (2) one or more of a position of a point on: (a) a lane boundary of a lane of a road in the image, (b) a road boundary of the road, or (c) another landmark in the image. The digital map can be transmitted to a first vehicle to be used to control a movement of the first vehicle.

Additionally, for example, the data affiliated with the images can be received from one or more second vehicles (e.g., probe vehicles). One or more cameras can be attached to the one or more second vehicles. For example, a camera, of the one or more cameras, can produce images. For example, the images can be produced at a specific production rate. For example, the specific production rate can be ten hertz. For example, the camera can be a component in a lane keeping assist (LKA) system. For example: (1) the data affiliated with the images can be received, by a system that implements the disclosed technologies, from the one or more second vehicles (e.g., the probe vehicles) at a first time, (2) the digital map, produced by the system that implements the disclosed technologies and from the data, can be transmitted to the first vehicle at a second time, and (3) a difference between the first time and the second time can be less than a specific duration of time. For example, the specific duration of time can be thirty minutes.

The disclosed technologies can produce the data affiliated with the images of the location using, for example, visual SLAM techniques. For example, a camera attached to a second vehicle (e.g., a probe vehicle) can produce the images. For example, the images can be produced at a specific production rate. For example, the specific production rate can be ten hertz. Objects in the images can be detected using, for example, object detection techniques. Objects in the images can be recognized using, for example, object recognition techniques. Semantic information can be affiliated with the objects. For example, objects that qualify as landmarks can be determined. For example, the landmarks can include lane boundaries, road boundaries, intersections, crosswalks, bus lanes, parking spots, signs, signs painted on roads, traffic lights, or the like.

A lane boundary can separate one lane of a road from another lane of the road. A lane boundary can be indicated, for example, by one or more of road surface markings, observations of differences in pavement on a road, observations of trajectories of vehicles, or the like. The road surface markings for a lane boundary can be, for example, lane markings. The lane markings can be, for example, a series of dashed line segments along the lane boundary.

A road boundary can separate an improved surface for use by vehicles and pedestrians (e.g., a drivable surface (e.g., a road)) from other surfaces. A road boundary can be indicated by one or more of road surface markings, curbs, observations of differences of degrees of improvement between adjacent surfaces, or the like. The road surface markings for a road boundary can be, for example, a continuous line along the road boundary.

Because: (1) positions, not depictions, of landmarks in an HD map used to control a movement of a vehicle need to be indicated with a high degree of accuracy and (2) images of a location can be produced at a specific production rate, depictions of the landmarks likely can be included in several of the images of the location. However, for an image, of the images of the location, a position of any of a lane boundary of a lane of a road in the image, a road boundary of the road, or another landmark in the image can be represented by a position of a point on the lane boundary, the road boundary, or the other landmark. For example, the position of the point on the lane boundary, the road boundary, or the landmark can be affiliated with a position of a keypoint of an object, in the image, that represents the lane boundary, the road boundary, or the landmark. A keypoint can be a point in an object that has a potential of being repeatedly detected under different imaging conditions. Keypoints in objects can be extracted using, for example, keypoint extraction techniques.

The second vehicle (e.g., the probe vehicle) can use, for example, proprioception information (e.g., one or more of GNSS information, IMU information, odometry information, or the like) to estimate a pose (i.e., a position and an orientation) of a camera (e.g., attached to the second vehicle). The second vehicle (e.g., the probe vehicle) can use, for example, as perceptual information, results of a photogrammetric range imaging technique (e.g., an SfM technique) to determine distances and bearings to the landmarks (e.g., keypoints) in the images. Positions of points (e.g., keypoints) on the landmarks can be determined, for example, using: (1) the pose of the camera (e.g., attached to the second vehicle) and (2) the distances and the bearings to the landmarks (e.g., keypoints) in the images.

In this manner, the data affiliated with the images of the location can, for an image of the images, exclude pixel color data, but include information about: (1) the pose of the camera that produced the image and (2) one or more positions of points on landmarks in the image. For example, an amount of the data affiliated with the image can be less than a threshold amount. For example, the threshold amount can be 300 bytes. For example, the landmark can be a sign. For example, the data affiliated with the images can include information about the sign. For example, the information about the sign can include: (1) for a center of the sign, a latitude position, a longitude position, and an altitude, (2) a height of the sign, and (3) a width of the sign. Additionally or alternatively, for example, the information about the sign can include information about a message communicated by the sign. For example, the data affiliated with the images can be produced by an automated driving system of active safety technologies and advanced driver assistance systems (ADAS). For example, the automated driving system can be a third generation of the Toyota Safety Sense™ system (TSS3).

For example, for a vehicle of the one or more second vehicles (e.g., the probe vehicles), a transmission of a batch of the data affiliated with the images, produced by a camera of the vehicle of the one or more second vehicles (e.g., the probe vehicles), can be received in a specific duration of time. For example, the specific duration of time can be thirty seconds. For example, the transmission of the batch can be received at a specific communication rate. For example, the specific communication rate can be once per thirty seconds.

The disclosed technologies can produce, from the data affiliated with the images of the location, the digital (e.g., HD) map of the location using, for example, offline SLAM techniques. For example, the digital map can be produced by processing, using one or more data association techniques, the data affiliated with the images to determine correspondence of the position of the point (e.g., keypoint) affiliated with a specific object (e.g., landmark), included in a first image of the images, with the position of the point (e.g., keypoint) affiliated with the specific object (e.g., landmark) included in a second image of the images.

For example, the digital (e.g., HD) map can be produced by processing, using one or more SLAM techniques, the data affiliated with the images of the location. For example, the location can be a specific region. Advantageously, processing the data for a specific region can limit a number of data association operations to be performed to produce the digital (e.g., HD) map of the location. For example, a shape of the specific region can be defined by seven regular hexagons. The seven regular hexagons can be arranged with one hexagon, of the seven regular hexagons, in a center position and another hexagon, of the seven regular hexagons, disposed on a side of the one hexagon. For example, each side of the one hexagon in the center position can be directly adjacent to a side of another hexagon. In this manner, the specific region can be a region in a hexagonal grid. Advantageously, use of a hexagonal grid can simplify calculations as the digital (e.g., HD) map is built out beyond the specific region. A distance between a center of a specific hexagon and a center of any adjacent hexagon can be the same as a distance between the center of the specific hexagon and a center of any other adjacent hexagon. In contrast, for a square grid, calculations for a distance between a center of a specific square and a center of any adjacent square can require consideration about whether the center of the adjacent square is orthogonal or diagonal to the center of the specific square. Additionally, advantageously, as the digital (e.g., HD) map is built out beyond the specific region, a hexagonal grid conforms better to a surface of a sphere (e.g., a globe) than a square grid.

For example, the digital (e.g., HD) map can be produced by grouping the images into keyframes and processing, using at least one SLAM optimization technique, the keyframes. For example: (1) a first keyframe, of the keyframes, can be characterized by a first measure, (2) a second keyframe, of the keyframes, can be characterized by a second measure, and (3) a difference between the first measure and the second measure can be greater than a threshold. The first measure can be of values of the data included in the first keyframe. The second measure can be of values of the data included in the second keyframe. For example, a count of the images included in a keyframe can be a function of a distance traveled by the second vehicle (e.g., the probe vehicle).

FIG. 1 includes a diagram that illustrates an example of an environment 100 for producing, from data affiliated with images of a location, but excluding pixel color data, a digital map of the location, according to the disclosed technologies. For example, the environment 100 can include a first road 102 (disposed along a line of longitude), a second road 104 (disposed along a line of latitude), and a parking lot 106. For example, an intersection 108 can be formed by the first road 102 and the second road 104. For example, the intersection 108 can be a T intersection. For example, the second road 104 can connect the first road 102 to the parking lot 106. For example, a building 110 can be located within the parking lot 106. For example, the environment 100 can include a first road sign 112 and a second road sign 114. For example, the first road sign 112 can be located at a southeast corner of the intersection 108. For example, the first road sign 112 can be a "No Parking" road sign. For example, the second road sign 114 can be located four meters south of the first road sign 112. For example, the second road sign 114 can be a "Speed Limit 25" road sign.

For example, the first road 102 can include a lane #1 116 for southbound traffic, a lane #1 118 for northbound traffic, and a lane #2 120 for northbound traffic. For example, the lane #1 116 can be bounded on the west by a road boundary 122. For example, the lane #2 120 can be bounded on the cast by a road boundary 124 south of the intersection 108 and by a road boundary 126 north of the intersection 108. For example, the lane #1 116 can be bounded on the cast and the lane #1 118 can be bounded on the west by a lane boundary 128. For example, the lane boundary 128 can be a lane marking 130 that indicates a separation between lanes in which streams of traffic flow in opposite directions. For example, the lane marking 130 can be two solid yellow lines. For example, the lane #1 118 can be bounded on the east and the lane #2 120 can be bounded on the west by a lane boundary 132. For example, the lane boundary 132 can be a lane marking 134 that indicates a separation between lanes in which streams of traffic flow in a same direction. For example, the lane marking 134 can be a dashed white line. For example, from north to south, the lane marking 134 can include a first segment 136, a second segment 138, a third segment 140, a fourth segment 142, a fifth segment 144, a sixth segment 146, a seventh segment 148, and an eighth segment 150.

For example, the second road 104 can include a lane #1 152 for westbound traffic and a lane #1 154 for eastbound traffic. For example, the lane #1 152 can be bounded on the north by a road boundary 156. For example, the lane #1 154 can be bounded on the south by a road boundary 158. For example, the lane #1 152 can be bounded on the south and the lane #1 154 can be bounded on the north by a lane boundary 160. For example, the lane boundary 160 can be a lane marking 162 that indicates a separation between lanes in which streams of traffic flow in opposite directions. For example, the lane marking 162 can be two solid yellow lines.

For example, the environment 100 can include a first vehicle 164, a second vehicle 166, and a third vehicle 168. For example, a forward-facing camera 170 can be attached to the first vehicle 164. For example, a forward-facing camera 172 can be attached to the second vehicle 166. For example, a communications device 174 can be disposed on the first vehicle 164. For example, a communications device 176 can be disposed on the second vehicle 166. For example, a communications device 178 can be disposed on the third vehicle 168.

For example, the environment 100 can include a system 180 for producing, from data affiliated with images of a location, a digital map. For example, the system 180 can include a communications device 182.

For example, the environment 100 can include a region 184. For example, the region 184 can include a portion of the road boundary 124, a portion of the road boundary 158, and the first road sign 112.

For example, at a first time ($t_1$), the first vehicle 164 can be located in the lane #2 120 just behind the third segment 140, the second vehicle 166 can be located in the lane #2 120 just behind the eighth segment 150, and the third vehicle 168 can be located in the lane #2 120 about fifteen miles behind the second vehicle 166.

For example, at a second time ($t_2$), the first vehicle 164 can be located in the lane #2 120 abreast of the third segment 140, the second vehicle 166 can be located in the lane #2 120 abreast of the eighth segment 150, and the third vehicle 168 can be located in the lane #2 120 about fifteen miles behind the second vehicle 166.

For example, at a third time ($t_3$), the second vehicle 166 can be located in the lane #2 120 just behind the third segment 140. That is, at the third time ($t_3$), a position of the second vehicle 166 can be at the position of the first vehicle 164 at the first time ($t_1$).

For example, at a fourth time ($t_4$), the second vehicle 166 can be located in the lane #2 120 abreast of the third segment 140. That is, at the fourth time ($t_4$), a position of the second vehicle 166 can be at the position of the first vehicle 164 at the second time ($t_2$).

As described above, objects in an image can be detected using, for example, object detection techniques and recognized using, for example, object recognition techniques. Semantic information can be affiliated with the objects and objects that qualify as landmarks can be determined. For example, the landmarks can include lane boundaries, road boundaries, signs, or the like.

Figure 2:
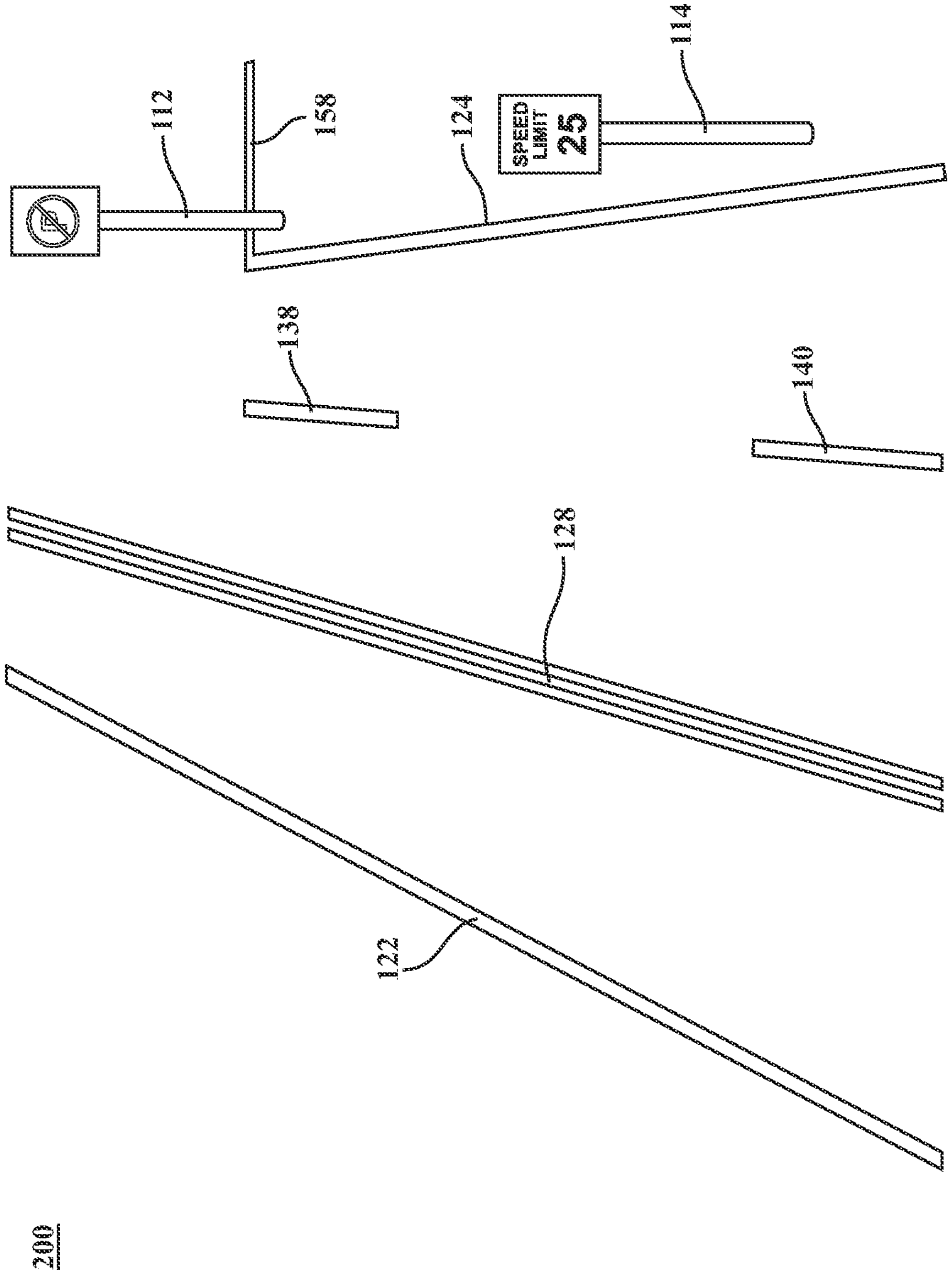
FIG. 2 includes a diagram that illustrates an example of an image produced, at a first time ($t_1$), by a forward-facing camera attached to a vehicle, according to the disclosed technologies.

FIG. 2 includes a diagram that illustrates an example of an image 200 produced, at the first time ($t_1$), by the forward-facing camera 170 attached to the first vehicle 164, according to the disclosed technologies. For example, the image 200 can include the following landmarks: the first road sign 112, the second road sign 114, the road boundary 122, the road boundary 124, the lane boundary 128, the second segment 138, the third segment 140, and the road boundary 158. For example, the image 200 can also be produced, at the third time ($t_3$), by the forward-facing camera 172 attached to the second vehicle 166.

Figure 3:
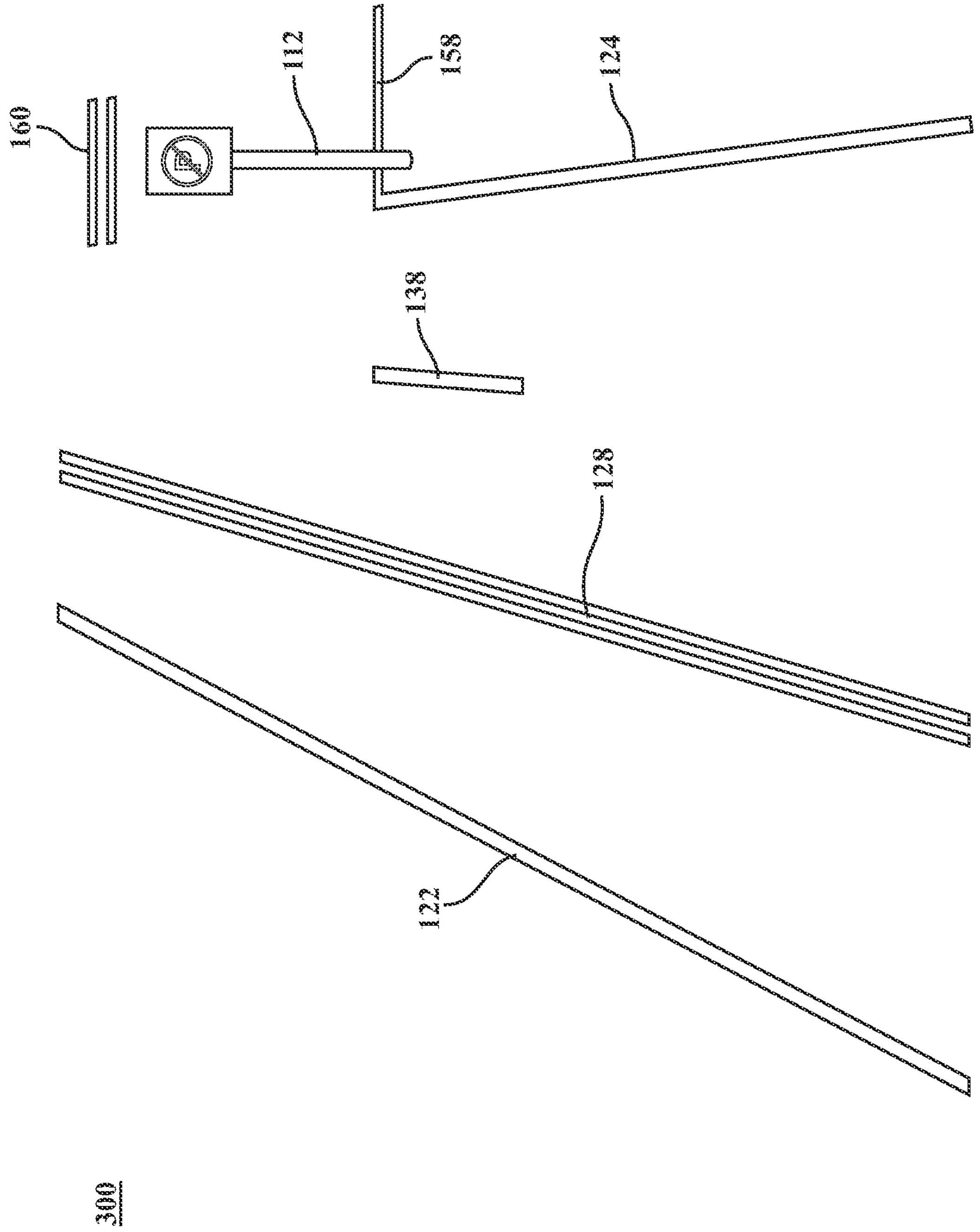
FIG. 3 includes a diagram that illustrates an example of an image produced, at a second time ($t_2$), by the forward-facing camera attached to the vehicle, according to the disclosed technologies.

FIG. 3 includes a diagram that illustrates an example of an image 300 produced, at the second time ($t_2$), by the forward-facing camera 170 attached to the first vehicle 164, according to the disclosed technologies. For example, the image 300 can include the following landmarks: the first road sign 112, the road boundary 122, the road boundary 124, the lane boundary 128, the second segment 138, the road boundary 158, and the lane boundary 160. For example, the image 300 can also be produced, at the fourth time ($t_4$), by the forward-facing camera 172 attached to the second vehicle 166.

For example, the images (i.e., the image 200 and the image 300) produced by the forward-facing camera 170 (or the forward-facing camera 172) can be images in a sequence of images produced by the forward-facing camera 170 (or the forward-facing camera 172). For example, the images (i.e., the image 200 and the image 300) produced by the forward-facing camera 170 (or the forward-facing camera 172) can be produced at a specific production rate. For example, the specific production rate can be ten hertz.

As described above, a position of a landmark can be represented by a position of a point on the landmark. For example, the position of the point on the landmark can be affiliated with a position of a keypoint of an object, in an image, that represents the landmark. A keypoint can be a point in an object that has a potential of being repeatedly detected under different imaging conditions. Keypoints in objects can be extracted using, for example, keypoint extraction techniques.

Figure 4:
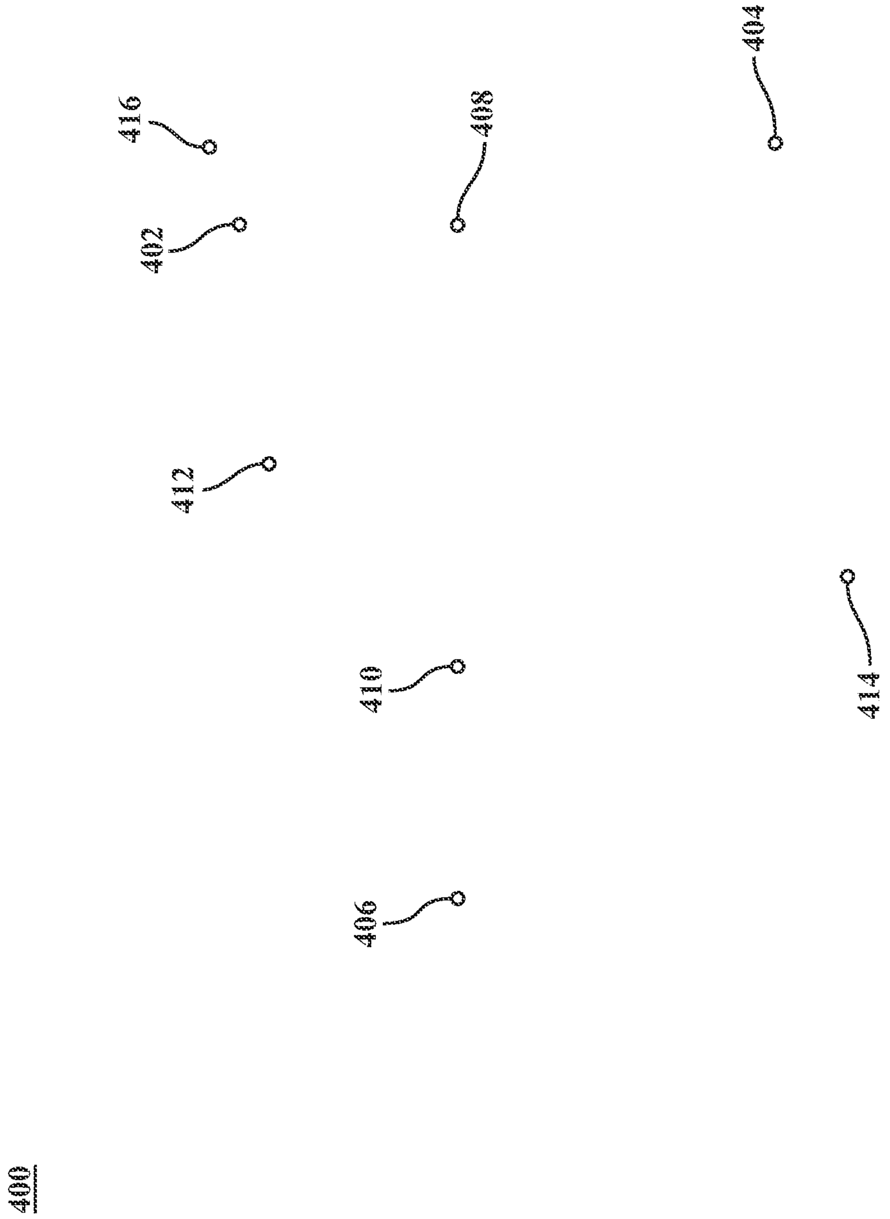
FIG. 4 includes a diagram that illustrates an example of keypoints of landmarks in the image included in FIG. 2, according to the disclosed technologies.

FIG. 4 includes a diagram that illustrates an example of keypoints 400 of landmarks in the image 200, according to the disclosed technologies. For example, the keypoints 400 can include a first keypoint 402 of the first road sign 112, a second keypoint 404 of the second road sign 114, a third keypoint 406 of the road boundary 122, a fourth keypoint 408 of the road boundary 124, a fifth keypoint 410 of the lane boundary 128, a sixth keypoint 412 of the second segment 138, a seventh keypoint 414 of the third segment 140, and an eighth keypoint 416 of the road boundary 158. For example, because only those parts of the road boundary 122, the road boundary 124, and the lane boundary 128 captured by the forward-facing camera 170 (or the forward-facing camera 172) are included in the image 200, the third keypoint 406, the fourth keypoint 408, and the fifth keypoint 410 can be for those parts of the road boundary 122, the road boundary 124, and the lane boundary 128 captured by the forward-facing camera 170 (or the forward-facing camera 172) at the first time ($t_1$) (or the third time ($t_3$)).

Figure 5:
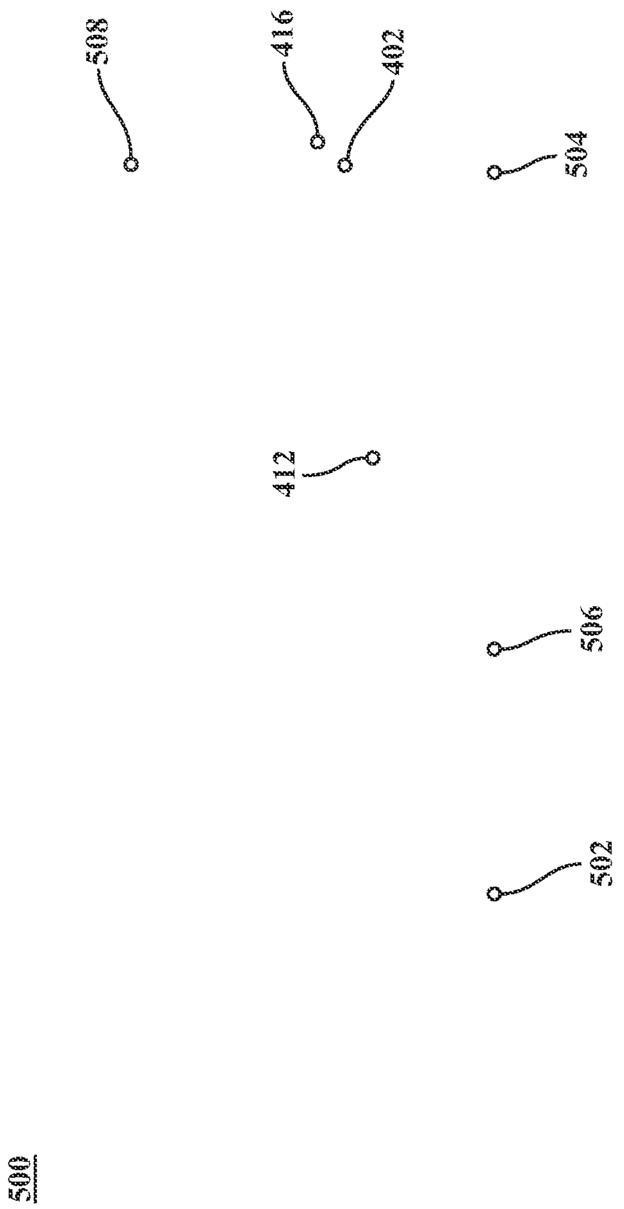
FIG. 5 includes a diagram that illustrates an example of keypoints of landmarks in the image included in FIG. 3, according to the disclosed technologies.

FIG. 5 includes a diagram that illustrates an example of keypoints 500 of landmarks in the image 300, according to the disclosed technologies. For example, the keypoints 500 can include the first keypoint 402 of the first road sign 112, a ninth keypoint 502 of the road boundary 122, a tenth keypoint 504 of the road boundary 124, an eleventh keypoint 506 of the lane boundary 128, the sixth keypoint 412 of the second segment 138, the eighth keypoint 416 of the road boundary 158, and a twelfth keypoint 508 of the lane boundary 160. For example, because only those parts of the road boundary 122, the road boundary 124, and the lane boundary 128 captured by the forward-facing camera 170 (or the forward-facing camera 172) are included in the image 300, the ninth keypoint 502, the tenth keypoint 504, and the eleventh keypoint 506 can be for those parts of the road boundary 122, the road boundary 124, and the lane boundary 128 captured by the forward-facing camera 170 (or the forward-facing camera 172) at the second time ($t_2$) (or the fourth time ($t_4$)). Moreover, portions of those parts of the road boundary 122, the road boundary 124, and the lane boundary 128 captured by the forward-facing camera 170 (or the forward-facing camera 172) included in the image 300 can be different from portions of those parts of the road boundary 122, the road boundary 124, and the lane boundary 128 captured by the forward-facing camera 170 (or the forward-facing camera 172) included in the image 200.

As described above, positions of points (e.g., keypoints) on the landmarks can be determined, for example, using: (1) a pose (i.e., a position and an orientation) of a camera (e.g., attached to the second vehicle (e.g., the forward-facing camera 170 attached to the first vehicle 164 or the forward-facing camera 172 attached to the second vehicle 166)) and (2) distances and bearings to the landmarks (e.g., keypoints) in the images. The second vehicle can use, for example, proprioception information (e.g., one or more of GNSS information, IMU information, odometry information, or the like) to estimate the pose of the camera (e.g., attached to the second vehicle). The second vehicle can use, for example, as perceptual information, results of a photogrammetric range imaging technique (e.g., an SfM technique) to determine the distances and the bearings to the landmarks (e.g., keypoints) in the images.

As described above, in this manner, data affiliated with the images of a location can, for an image of the images, exclude pixel color data, but include information about: (1) the pose of the camera that produced the image and (2) one or more positions of points (e.g., keypoints) on landmarks in the image. For example, if the landmark is a sign, the data affiliated with the images can include information about the sign. For example, the information about the sign can include: (1) for a center of the sign, a latitude position, a longitude position, and an altitude, (2) a height of the sign, and (3) a width of the sign. Additionally or alternatively, for example, the information about the sign can include information about a message communicated by the sign.

FIGS. 6A and 6B include an example of tables 600 that illustrate data affiliated with images of a location, according to the disclosed technologies. The tables 600 can include: (1) a first table 602 that illustrates items of the data affiliated with the image 200 produced, at the first time ($t_1$), by the forward-facing camera 170 attached to the first vehicle 164; (2) a second table 604 that illustrates items of the data affiliated with the image 300 produced, at the second time ($t_2$), by the forward-facing camera 170 attached to the first vehicle 164; (3) a third table 606 that illustrates items of the data affiliated with the image 200 produced, at the third time ($t_3$), by the forward-facing camera 172 attached to the second vehicle 166; and (4) a fourth table 608 that illustrates items of the data affiliated with the image 300 produced, at the fourth time ($t_4$), by the forward-facing camera 172 attached to the second vehicle 166.

For example: (1) the first table 602 can include a pose 610 of the forward-facing camera 170 attached to the first vehicle 164 at the first time ($t_1$), (2) the second table 604 can include a pose 612 of the forward-facing camera 170 attached to the first vehicle 164 at the second time ($t_2$), (3) the third table 606 can include a pose 614 of the forward-facing camera 172 attached to the second vehicle 166 at the third time ($t_3$), and (4) the fourth table 608 can include a pose 616 of the forward-facing camera 172 attached to the second vehicle 166 at the fourth time ($t_4$).

Each of the first table 602 and the third table 606 can include, for example, data affiliated with the first keypoint 402, the second keypoint 404, the third keypoint 406, the fourth keypoint 408, the fifth keypoint 410, the sixth keypoint 412, the seventh keypoint 414, and the eighth keypoint 416.

Each of the second table 604 and the fourth table 608 can include, for example, data affiliated with the first keypoint 402, the ninth keypoint 502, the tenth keypoint 504, the eleventh keypoint 506, the sixth keypoint 412, the eighth keypoint 416, and the twelfth keypoint 508.

One or more circumstances affiliated with production of the data affiliated with the images of the location can cause, for example, the information about: (1) the pose of the camera, (2) the one or more positions of the points on the landmarks, or (3) both to include one or more errors. For example, errors in the proprioception information (e.g., the one or more of the GNSS information, the IMU information, the odometry information, or the like) can cause the information about the pose of the camera to include one or more errors. For example, changes in illumination of one or more of the landmarks at one or more of the first time ($t_1$), the second time ($t_2$), the third time ($t_3$), or the fourth time ($t_4$) can cause the results the photogrammetric range imaging technique (e.g., the SfM technique) to include one or more errors so that the distances and the bearings to the landmarks (e.g., keypoints) in the images, determined from the photogrammetric range imaging technique (e.g., the SfM technique), include one or more errors. One of skill in the art, in light of the description herein, understands that one or more other circumstances can cause one or more other errors to be included in the information about: (1) the pose of the camera, (2) the one or more positions of the points on the landmarks, or (3) both. Individually or cumulatively, these errors can cause information included in an item of the data affiliated with an image produced at one time by a specific source (e.g., the forward-facing camera 170 attached to the first vehicle 164 or the forward-facing camera 172 attached to the second vehicle 166) to be different from a corresponding item of data affiliated with an image produced: (1) at a different time, (2) by a different specific source, or (3) both. This situation is illustrated in values of the items of the data contained in the tables 600 included in FIGS. 6A and 6B.

As described above, the first vehicle 164, the second vehicle 166, or both can transmit the data affiliated with the images to the system 180 for producing, from the data affiliated with images of the location, the digital map. For example, the communications device 174 disposed on the first vehicle 164 can transmit the data, produced at the first time ($t_1$) and at the second time ($t_2$) (e.g., the first table 602 and the second table 604), to the communications device 182 included in the system 180. Likewise, for example, the communications device 176 disposed on the second vehicle 166 can transmit the data, produced at the third time ($t_3$) and at the fourth time ($t_4$) (e.g., the third table 606 and the fourth table 608), to the communications device 182 included in the system 180.

Figure 7:
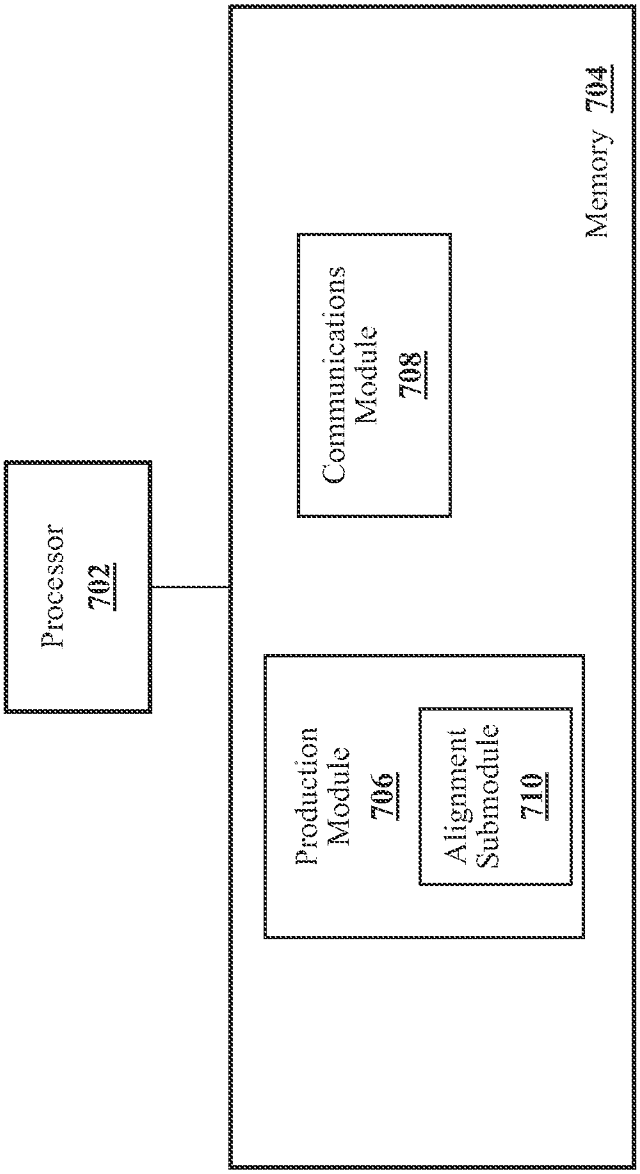
FIG. 7 is a block diagram that illustrates an example of a system for producing, from data affiliated with images of a location, a digital map, according to the disclosed technologies.

FIG. 7 is a block diagram that illustrates an example of a system 700 for producing, from data affiliated with images of a location, a digital map, according to the disclosed technologies. For example, the system 700 can be the system 180 illustrated in FIG. 1. The system 700 can include, for example, a processor 702 and a memory 704. The memory 704 can be communicably coupled to the processor 702. For example, the memory 704 can store a production module 706 and a communications module 708.

For example, the production module 706 can include instructions that function to control the processor 702 to produce, from the data, the digital map. The data, for an image of the images, can exclude pixel color data, but can include information about: (1) a pose of a camera that produced the image and (2) one or more of a position of a point on: (a) a lane boundary of a lane of a road in the image, (b) a road boundary of the road, or (c) another landmark in the image.

For example, one or more of the positions of the point on the lane boundary, the road boundary, or the landmark can be affiliated with a position of a keypoint of an object, in the image, that represents the lane boundary, the road boundary, or the landmark. A keypoint can be a point in an object that has a potential of being repeatedly detected under different imaging conditions. Keypoints in objects can be extracted using, for example, keypoint extraction techniques.

For example, the landmark can be a sign. For example, the data affiliated with the images can include information about the sign. For example, the information about the sign can include: (1) for a center of the sign, a latitude position, a longitude position, and an altitude, (2) a height of the sign, and (3) a width of the sign. Additionally or alternatively, for example, the information about the sign can include information about a message communicated by the sign.

For example, the communications module 708 can include instructions that function to control the processor 702 to cause the processor 702 to transmit the digital map to a first vehicle to be used to control a movement of the first vehicle. With reference to FIG. 1, for example, the instructions to cause the processor 702 to transmit the digital map can cause the communications device 182 included in the system 180 to transmit the digital map to the communications device 178 disposed on the third vehicle 168.

Additionally, for example, the communications module 708 can include instructions that function to control the processor 702 to receive, from one or more second vehicles, the data affiliated with the images. (For example, the camera can include one or more cameras and the one or more cameras can be attached to the one or more second vehicles.)

For example, a camera, of the one or more cameras, can be a component in a lane keeping assist (LKA) system. For example, the images can be produced at a specific production rate. For example, the specific production rate can be ten hertz. For example, an amount of the data, for an image, can be less than a threshold amount. For example, the threshold amount can be 300 bytes. For example, the data affiliated with the images can be produced by an automated driving system of active safety technologies and advanced driver assistance systems (ADAS). For example, the automated driving system can be a third generation of the Toyota Safety Sense™ system (TSS3).

With reference to FIGS. 1, 6A, and 6B, for example, the instructions to cause the processor 702 to receive the data can cause the communications device 182 included in the system 180 to receive the data (e.g., the items of the data contained in the tables 600) from one or more of the communications device 174 disposed on the first vehicle 164 or the communications device 176 disposed on the second vehicle 166.

For example: (1) an operation, by the system 700 (e.g., the system 180 illustrated in FIG. 1), of the instructions to receive the data can be configured to occur at a first time, (2) an operation, by the system 700 (e.g., the system 180 illustrated in FIG. 1), of the instructions to the transmit the digital map can be configured to occur at a second time, and (3) a difference between the first time and the second time can be less than a specific duration of time. For example, the specific duration of time can be thirty minutes. For example: (1) the data (e.g., the items of the data contained in the tables 600 included in FIGS. 6A and 6B), from one or more of first vehicle 164 or the second vehicle 166, can be received by the communications module 708 at the first time, (2) the digital map can be transmitted by the communications module 708 at the second time to the third vehicle 168, and (3) the difference between the first time and the second time can be less than the specific duration of time (e.g., thirty minutes).

For example, the instructions to receive can include instructions to receive, from a vehicle of the one or more second vehicles and at a specific communication rate, a transmission of a batch of the data affiliated with the images produced by a corresponding camera in a duration of time affiliated with the specific communication rate. For example, the specific communication rate can be once per thirty seconds. With reference to FIGS. 1-3, 6A, and 6B, for example, if: (1) the forward-facing camera 170 attached to the first vehicle 164 produces images at a specific production rate (e.g., ten hertz), (2) the image 200 is produced, at the first time ($t_1$), by the forward-facing camera 170, (3) the image 300 is produced, at the second time ($t_2$), by the forward-facing camera 170, and (4) the communications device 174 disposed on the first vehicle 164 transmits a batch of the data affiliated with the images produced by the forward-facing camera 170 at a specific communication rate (e.g., once per thirty seconds), then the image 200 and the image 300 can be a subset of images affiliated with the batch (e.g., three hundred) and the items of data contained in the first table 602 (affiliated with the image 200 produced by the forward-facing camera 170) and the second table 604 (affiliated with the image 300 produced by the forward-facing camera 170) can be a subset of the data included in the batch. That is, operations performed at the first vehicle 164 can: (1) produce the images at the specific production rate (e.g. ten hertz), (2) produce, at the specific production rate, the data affiliated with the images, (3) store, for each image, the data affiliated with the image, and (4) transmit, at the specific communication rate (e.g., once per thirty seconds), the data affiliated with the images produced in the duration of time (e.g., thirty seconds) affiliated with the specific communication rate.

Figure 8:
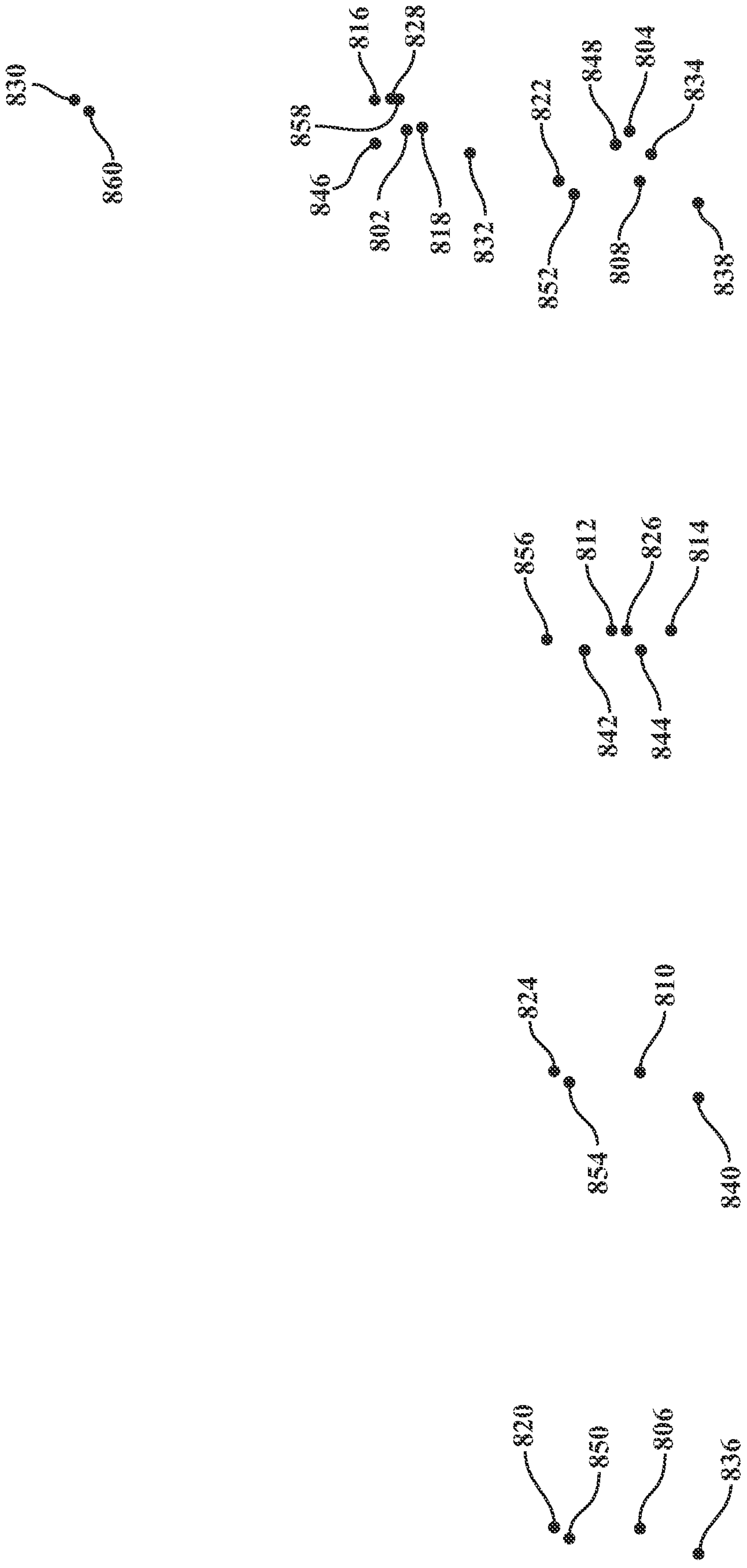
FIG. 8 includes a diagram that illustrates an example of the positions of the keypoints of the landmarks affiliated with the items of the data contained in the tables included in FIGS. 6A and 6B, according to the disclosed technologies.

FIG. 8 includes a diagram 800 that illustrates an example of the positions of the points (e.g., the keypoints) of the landmarks affiliated with the items of the data contained in the tables 600 included in FIGS. 6A and 6B, according to the disclosed technologies. For example, the diagram 800 can include: (1) a position 802 of the first keypoint 402 determined at the first time ($t_1$), (2) a position 804 of the second keypoint 404 determined at the first time ($t_1$), (3) a position 806 of the third keypoint 406 determined at the first time ($t_1$), (4) a position 808 of the fourth keypoint 408 determined at the first time ($t_1$), (5) a position 810 of the fifth keypoint 410 determined at the first time ($t_1$), (6) a position 812 of the sixth keypoint 412 determined at the first time ($t_1$), (7) a position 814 of the seventh keypoint 414 determined at the first time ($t_1$), (8) a position 816 of the eighth keypoint 416 determined at the first time ($t_1$), (9) a position 818 of the first keypoint 402 determined at the second time ($t_2$), (10) a position 820 of the ninth keypoint 502 determined at the second time ($t_2$), (11) a position 822 of the tenth keypoint 504 determined at the second time ($t_2$), (12) a position 824 of the eleventh keypoint 506 determined at the second time ($t_2$), (13) a position 826 of the sixth keypoint 412 determined at the second time ($t_2$), (14) a position 828 of the eighth keypoint 416 determined at the second time ($t_2$), (15) a position 830 of the twelfth keypoint 508 determined at the second time ($t_2$), (16) a position 832 of the first keypoint 402 determined at the third time ($t_3$), (17) a position 834 of the second keypoint 404 determined at the third time ($t_3$), (18) a position 836 of the third keypoint 406 determined at the third time ($t_3$), (19) a position 838 of the fourth keypoint 408 determined at the third time ($t_3$), (20) a position 840 of the fifth keypoint 410 determined at the third time ($t_3$), (21) a position 842 of the sixth keypoint 412 determined at the third time ($t_3$), (22) a position 844 of the seventh keypoint 414 determined at the third time ($t_3$), (23) a position 846 of the eighth keypoint 416 determined at the third time ($t_3$), (24) a position 848 of the first keypoint 402 determined at the fourth time ($t_4$), (25) a position 850 of the ninth keypoint 502 determined at the fourth time ($t_4$), (26) a position 852 of the tenth keypoint 504 determined at the fourth time ($t_4$), (27) a position 854 of the eleventh keypoint 506 determined at the fourth time ($t_4$), (28) a position 856 of the sixth keypoint 412 determined at the fourth time ($t_4$), (29) a position 858 of the eighth keypoint 416 determined at the fourth time ($t_4$), and (30) a position 860 of the twelfth keypoint 508 determined at the fourth time ($t_4$).

For example, the instructions to produce the digital map can include instructions to process, using one or more data association operations, the data affiliated with the images to determine correspondence of the position of the point affiliated with a specific object, included in a first image of the images, with the position of the point affiliated with the specific object included in a second image of the images. For example, the one or more data association operations can determine correspondence of: (1) the position 802 with the position 818, the position 832, and the position 848, (2) the position 804 with the position 834, (3) the position 806 with the position 836, (4) the position 808 with the position 838, (5) the position 810 with the position 840, (6) the position 812 with the position 826, the position 842, and the position 856, (7) the position 814 with the position 844, (8) the position 816 with the position 828, the position 846, and the position 858, (8) the position 820 with the position 850, (9) the position 822 with the position 852, (10) the position 824 with the position 854, and (11) the position 830 with the position 860.

Figure 9:
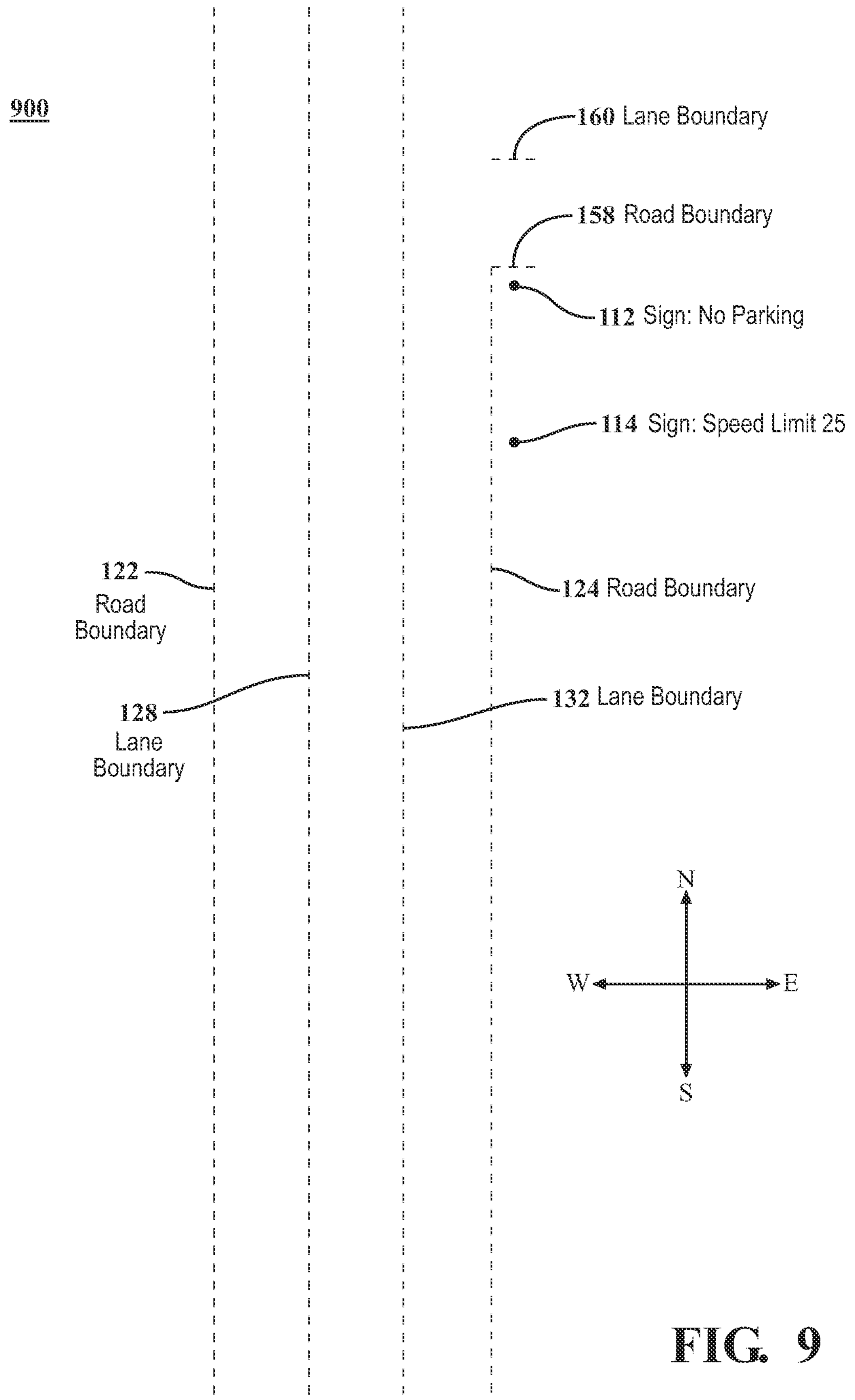
FIG. 9 includes an example of a digital map, according to the disclosed technologies.

FIG. 9 includes an example of a digital map 900, according to the disclosed technologies. For example, the digital map 900 can include representations of the position of: (1) the first road sign 112 (based on the position 802, the position 818, the position 832, and the position 848), (2) the second road sign 114 (based on the position 804 and the position 834), (3) the road boundary 122 (based on the position 806, the position 820, the position 836, and the position 850), (4) the road boundary 124 (based on the position 808, the position 822, the position 838, and the position 852), (5) the lane boundary 128 (based on the position 810, the position 824, the position 840, and the position 854), (6) the lane boundary 132 (based on the position 812, the position 814, the position 826, the position 842, the position 844, and the position 856), (7) the road boundary 158 (based on the position 816, the position 828, the position 846, and the position 858), and (8) the lane boundary 160 (based on the position 830 and the position 860).

For example, the instructions to produce the digital map can include: (1) instructions to group the images into keyframes and (2) instructions to process, using one or more simultaneous localization and mapping (SLAM) optimization techniques, the keyframes. For example: (1) a first keyframe, of the keyframes, can be characterized by a first measure, (2) a second keyframe, of the keyframes, can be characterized by a second measure, and (3) a difference between the first measure and the second measure can be greater than a threshold. For example, the first measure can be of values of the data included in the first keyframe and the second measure can be of values of the data included in the second keyframe. As an illustrative example, the image 200 includes the second road sign 114 and the third segment 140, which are not included in the image 300. Likewise, for example, the image 300 includes the lane boundary 160, which is not included in the image 200. If a value of a threshold is set so that a difference between a measure of values of the data included in the image 200 and a measure of values of the data included in the image 300 is greater than the threshold, then the image 200 can be affiliated with a first keyframe and the image 300 can be affiliated with a second keyframe. More generally, for example, a count of the images included in a keyframe, of the keyframes, can be a function of a distance traveled by a vehicle that produced the images. For example, because a segment, of a dashed white line lane marking that indicates a separation between lanes in which streams of traffic flow in a same direction, can have a length of about one meter, a distance traveled by the first vehicle 164 between the first time ($t_1$) and second time ($t_2$) can be about one meter. Accordingly, both the image 200 and the image 300 include the first road sign 112, the road boundary 122, the road boundary 124, the lane boundary 128, the second segment 138, and the road boundary 158. Depending upon the value to which the threshold is set, both the image 200 and the image 300 can be included in a same keyframe because the distance traveled by the first vehicle 164 (e.g., about one meter) may not be sufficiently long enough for the difference between the measure of the values of the data included in the image 200 and the measure of the values of the data included in the image 300 to be greater than the threshold.

For example, the instructions to produce the digital map can include instructions to process, using one or more SLAM techniques, the data affiliated with the images of the location. For example, the location can be a specific region. Advantageously, processing the data for a specific region can limit a number of data association operations to be performed to produce the digital map of the location. For example, one or more SLAM techniques can be performed for each of a first specific region and a second specific region, which can be adjacent to the first specific region. For example, after such SLAM techniques have been performed for each of the first specific region and the second specific region, one or more SLAM techniques can be performed on a third specific region, which can partially overlap each of the first specific region and the second specific region. For example, a shape of the specific region can be defined by seven regular hexagons arranged with one hexagon, of the seven regular hexagons, in a center position and another hexagon, of the seven regular hexagons, disposed on a side of the one hexagon. For example, each side of the one hexagon in the center position can be directly adjacent to a side of another hexagon. In this manner, the specific region can be a region in a hexagonal grid. Advantageously, use of a hexagonal grid can simplify calculations as the digital map is built out beyond the specific region. A distance between a center of a specific hexagon and a center of any adjacent hexagon can be the same as a distance between the center of the specific hexagon and a center of any other adjacent hexagon. In contrast, for a square grid, calculations for a distance between a center of a specific square and a center of any adjacent square can require consideration about whether the center of the adjacent square is orthogonal or diagonal to the center of the specific square. Additionally, advantageously, as the digital map is built out beyond the specific region, a hexagonal grid conforms better to a surface of a sphere (e.g., a globe) than a square grid.

Figure 10:
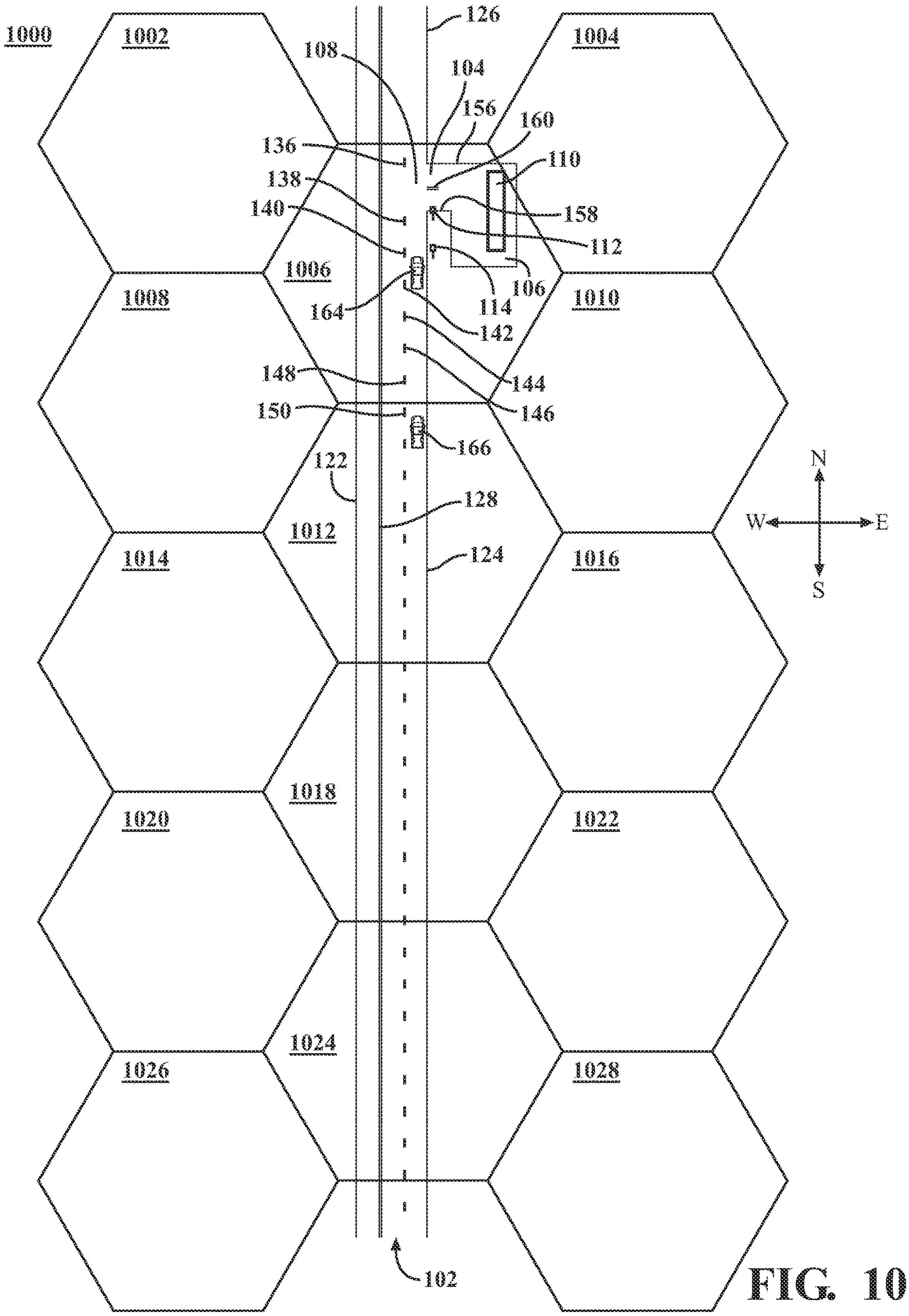
FIG. 10 includes a diagram that illustrates an example of a hexagonal grid superimposed on the environment illustrated in FIG. 1, according to the disclosed technologies.

FIG. 10 includes a diagram that illustrates an example of a hexagonal grid 1000 superimposed on the environment 100 illustrated in FIG. 1, according to the disclosed technologies. For example, the hexagon grid 1000 can include: (1) a first regular hexagon 1002, (2) a second regular hexagon 1004, (3) a third regular hexagon 1006, (4) a fourth regular hexagon 1008, (5) a fifth regular hexagon 1010, (6) a sixth regular hexagon 1012, (7) a seventh regular hexagon 1014, (8) an eighth regular hexagon 1016, (9) a ninth regular hexagon 1018, (10) a tenth regular hexagon 1020, (11) an eleventh regular hexagon 1022, (12) a twelfth regular hexagon 1024, (13) a thirteenth regular hexagon 1026, and (14) a fourteenth regular hexagon 1028.

For example, the shape of the specific region can be defined by the third regular hexagon 1006, the fourth regular hexagon 1008, the fifth regular hexagon 1010, the sixth regular hexagon 1012, the seventh regular hexagon 1014, the eighth regular hexagon 1016, and the ninth regular hexagon 1018. For example, the instructions to process, using the one or more SLAM techniques, the data affiliated with the images of the specific region can not only process the data affiliated with the images produced by the first vehicle 164 and the second vehicle 166 within the third regular hexagon 1006, but also data affiliated with images produced by one or more vehicles within any of the fourth regular hexagon 1008, the fifth regular hexagon 1010, the sixth regular hexagon 1012, the seventh regular hexagon 1014, the eighth regular hexagon 1016, or the ninth regular hexagon 1018. For example, the specific region can be a first specific region. For example, a shape of a second specific region can be defined by the twelfth regular hexagon 1024, the thirteenth regular hexagon 1026, the fourteenth regular hexagon 1028, and four other regular hexagons (not illustrated) south of the twelfth regular hexagon 1024, the thirteenth regular hexagon 1026, and the fourteenth regular hexagon 1028. For example, one or more SLAM techniques can be performed for each of the first specific region and the second specific region. For example, a shape of a third specific region can be defined by the sixth regular hexagon 1012, the seventh regular hexagon 1014, the eighth regular hexagon 1016, the ninth regular hexagon 1018, the tenth regular hexagon 1020, the eleventh regular hexagon 1022, and the twelfth regular hexagon 1024. For example, after such SLAM techniques have been performed for each of the first specific region and the second specific region, one or more SLAM techniques can be performed on the third specific region.

Returning to FIG. 7, additionally, for example, the production module 706, of the system 700 (e.g., the system 180 illustrated in FIG. 1), can include an alignment submodule 710. For example, the alignment submodule 710 can include instructions that function to control the processor 702 to align the position of the point, affiliated with a production of a version of the digital map, with a position of a point in a two-dimensional image of the location to produce a two-dimensional aligned digital map. For example, the two-dimensional image can be an aerial image and the two-dimensional aligned digital map can be an aerial image aligned digital map. For example, the aerial image can be a satellite image. Alternatively, for example, the aerial image can be produced by a camera associated with an aircraft.

Figure 11:
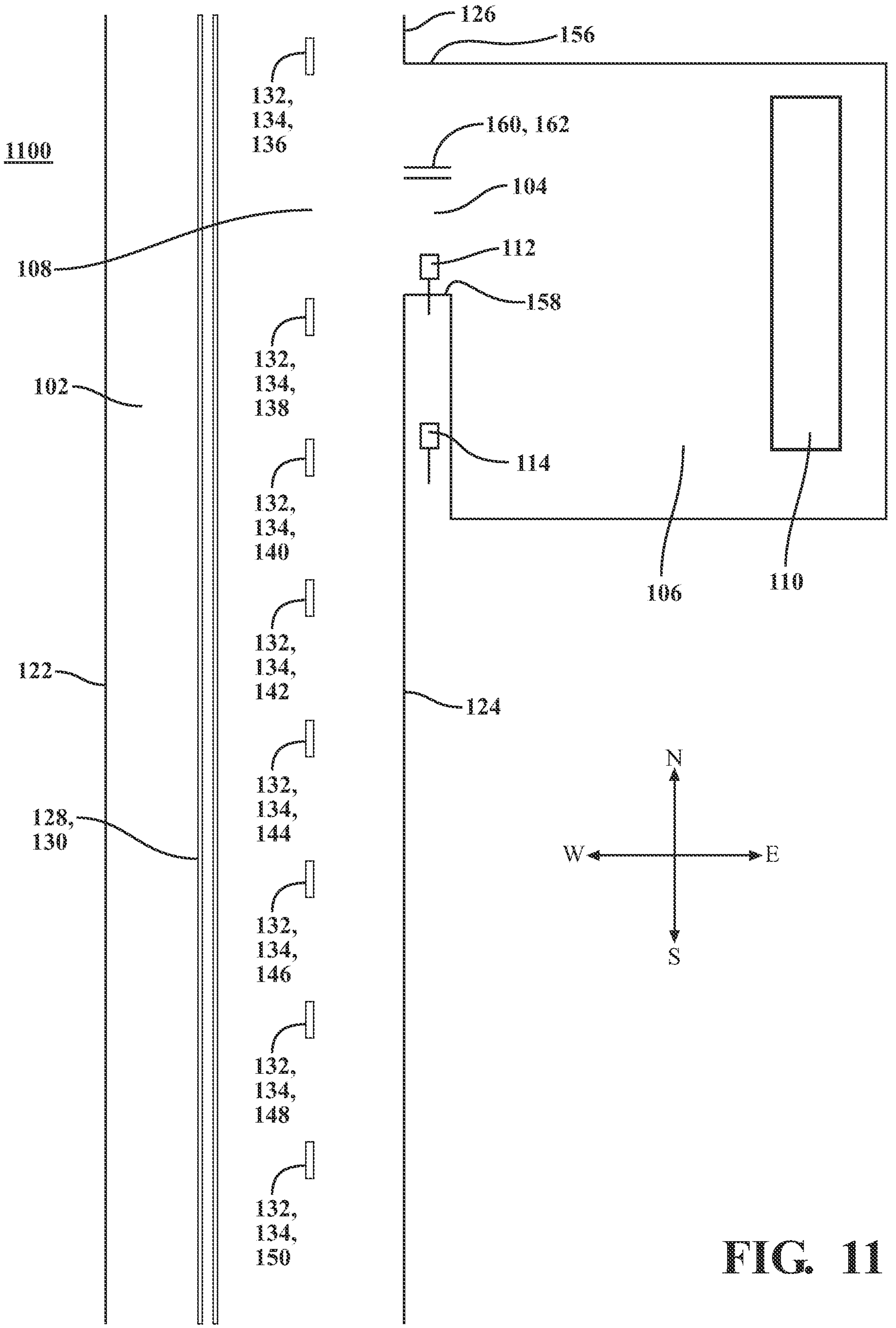
FIG. 11 includes an example of an aerial image of the environment illustrated in FIG. 1, according to the disclosed technologies.

FIG. 11 includes an example of an aerial image 1100 of the environment 100 illustrated in FIG. 1, according to the disclosed technologies. For example, the aerial image 1100 can include the first road 102, the second road 104, the parking lot 106, the intersection 108, the building 110, the first road sign 112, the second road sign 114, the road boundary 122, the road boundary 124, the road boundary 126, the lane boundary 128 (i.e., the lane marking 130 having two solid yellow lines), the lane boundary 132 (i.e., the lane marking 134 having a dashed white line that includes the first segment 136, the second segment 138, the third segment 140, the fourth segment 142, the fifth segment 144, the sixth segment 146, the seventh segment 148, and the eighth segment 150), the road boundary 156, the road boundary 158, and the lane boundary 160 (i.e., the lane marking 162 having two solid yellow lines).

For example, the instructions to align can include instructions to align, to correct for an error in one or more of proprioception information or perceptual information used by one or more SLAM techniques, the position of the point, affiliated with the production of the version of the digital map, with the position of the point in the aerial image to produce the aerial image aligned digital map. For example, such instructions to align can include at least one SLAM optimization technique.

As described above, one or more circumstances affiliated with production of the data affiliated with the images of the location can cause, for example, the information about: (1) the pose of the camera, (2) the one or more positions of the points on the landmarks, or (3) both to include one or more errors. For example, errors in the proprioception information (e.g., the one or more of the GNSS information, the IMU information, the odometry information, or the like) can cause the information about the pose of the camera to include one or more errors. For example, changes in illumination of one or more of the landmarks at one or more of the first time ($t_1$), the second time ($t_2$), the third time ($t_3$), or the fourth time ($t_4$) can cause the results the photogrammetric range imaging technique (e.g., the SfM technique) to include one or more errors so that the distances and the bearings to the landmarks (e.g., keypoints) in the images, determined from the photogrammetric range imaging technique (e.g., the SfM technique), include one or more errors. One of skill in the art, in light of the description herein, understands that one or more other circumstances can cause one or more other errors to be included in the information about: (1) the pose of the camera, (2) the one or more positions of the points on the landmarks, or (3) both. Individually or cumulatively, these errors can cause information included in an item of the data affiliated with an image produced at one time by a specific source (e.g., the forward-facing camera 170 attached to the first vehicle 164 or the forward-facing camera 172 attached to the second vehicle 166) to be different from a corresponding item of data affiliated with an image produced: (1) at a different time, (2) by a different specific source, or (3) both.

For example, information produced by a GNSS about positions can sometimes include errors that cause an accuracy of the positions to be skewed by about a same distance in about a same direction. Accordingly, in a situation in which proprioception information for a SLAM technique is produced by a GNSS in which such an error is present, a digital map produced by the SLAM technique may be misaligned.

For example, the instructions to align can be with respect to road boundaries. For example, the instructions to align can include instructions to detect, within a first copy of the aerial image, indications of road boundaries on improved surfaces for use by vehicles and pedestrians (e.g., drivable surfaces (e.g., roads)).

For example, the instructions to detect the indications of the road boundaries can include: (1) instructions to cause each pixel, in the first copy of the aerial image, affiliated with the improved surfaces to have a highest value to produce a temporary modified aerial image, (2) instructions to cause all other pixels, in the temporary modified aerial image, to have a lowest value, and (3) instructions to detect, in the temporary modified aerial image, the road boundaries.

Figure 12:
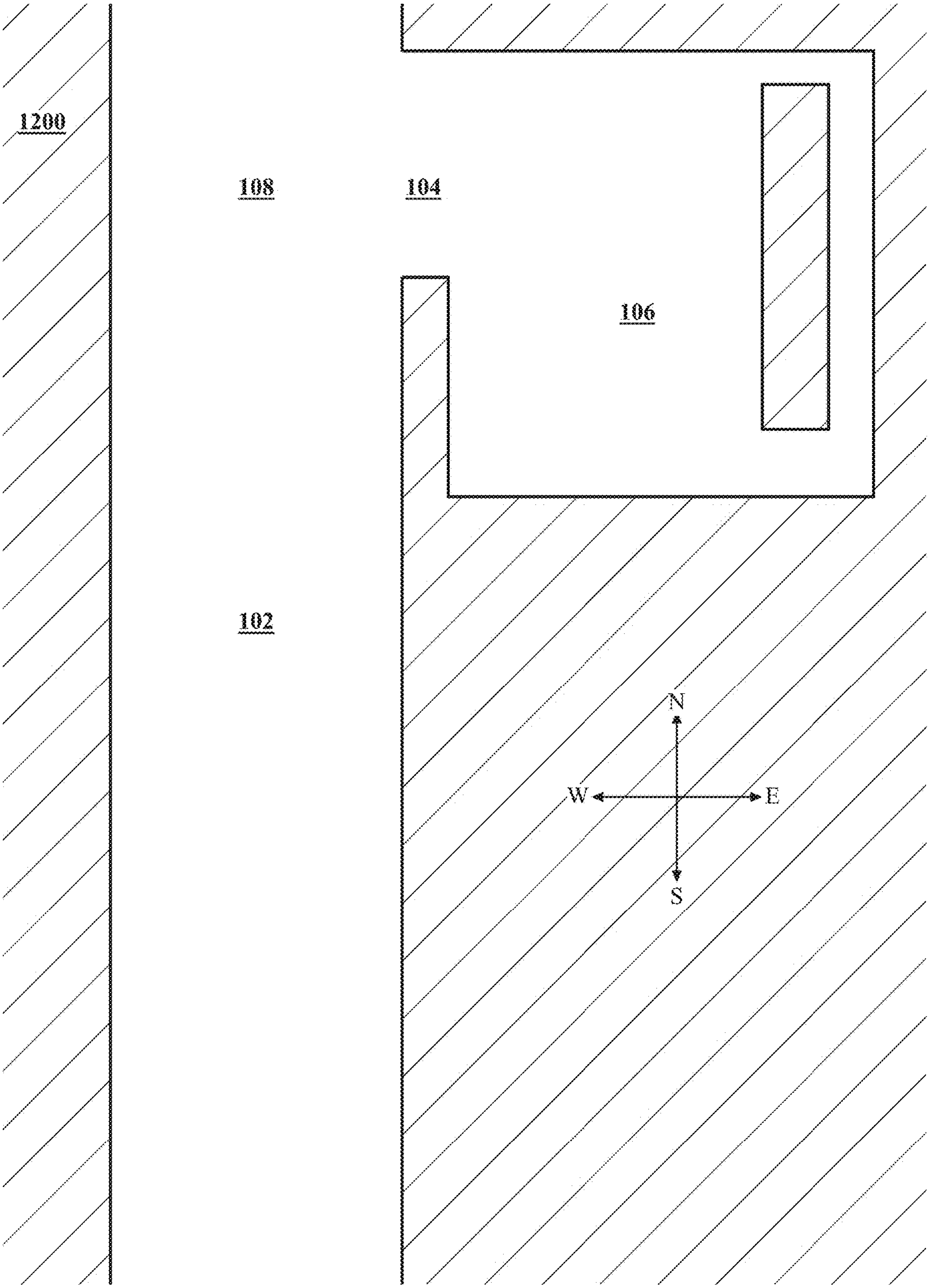
FIG. 12 includes an example of a first temporary modified aerial image of the environment illustrated in FIG. 1, according to the disclosed technologies.

FIG. 12 includes an example of a first temporary modified aerial image 1200 of the environment 100 illustrated in FIG. 1, according to the disclosed technologies. For example, the first temporary modified aerial image 1200 can include the first road 102, the second road 104, the parking lot 106, and the intersection 108.

Additionally, for example, the instructions to detect the indications of the road boundaries can further include instructions to cause each pixel, in the first copy of the aerial image, affiliated with the improved surfaces for use for parking by the vehicles to have the lowest value.

Figure 13:
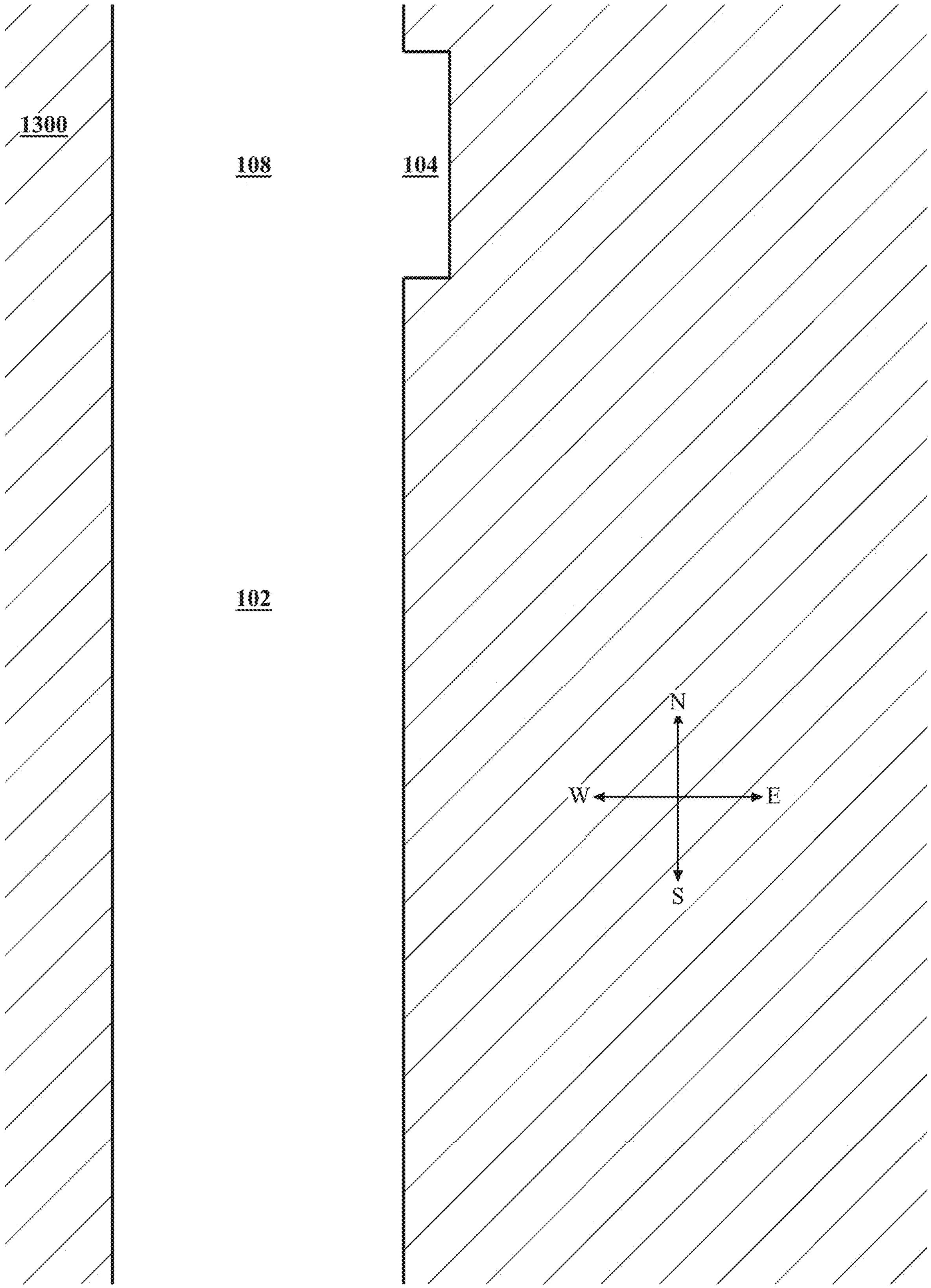
FIG. 13 includes an example of a second temporary modified aerial image of the environment illustrated in FIG. 1, according to the disclosed technologies.

FIG. 13 includes an example of a second temporary modified aerial image 1300 of the environment 100 illustrated in FIG. 1, according to the disclosed technologies. For example, the second temporary modified aerial image 1300 can include the first road 102, the second road 104, and the intersection 108.

For example, the instructions to align can further include: (1) instructions to cause each pixel, in the first copy of the aerial image, affiliated with the road boundaries to have a lowest value to produce a first modified aerial image, (2) instructions to cause all other pixels, in the first modified aerial image, to have a highest value, (3) instructions to determine, for a first pixel of the all other pixels, a first distance, and (4) instructions to change, as a first operation to produce a first segmentation mask, a value for the first pixel from the highest value to a first value that represents the first distance. For example, the first distance can be between a position at a location represented by a center of the first pixel and a position at a location represented by a nearest first pixel that has the lowest value.

For example, the position of the point, affiliated with the production of the version of the digital map, can be a position of a point on the road boundary and can coincide with a position, on the first segmentation mask, of the first pixel. For example, the instructions to align can further include instructions to cause, as an operation to produce the aerial image aligned digital map, the position of the point, affiliated with the production of the version of the digital map, to move by the first distance to a position that coincides with the position, on the first segmentation mask, of the nearest first pixel that has the lowest value. For example, such instructions to cause the position of the point to move can include at least one SLAM optimization technique.

Figure 14:
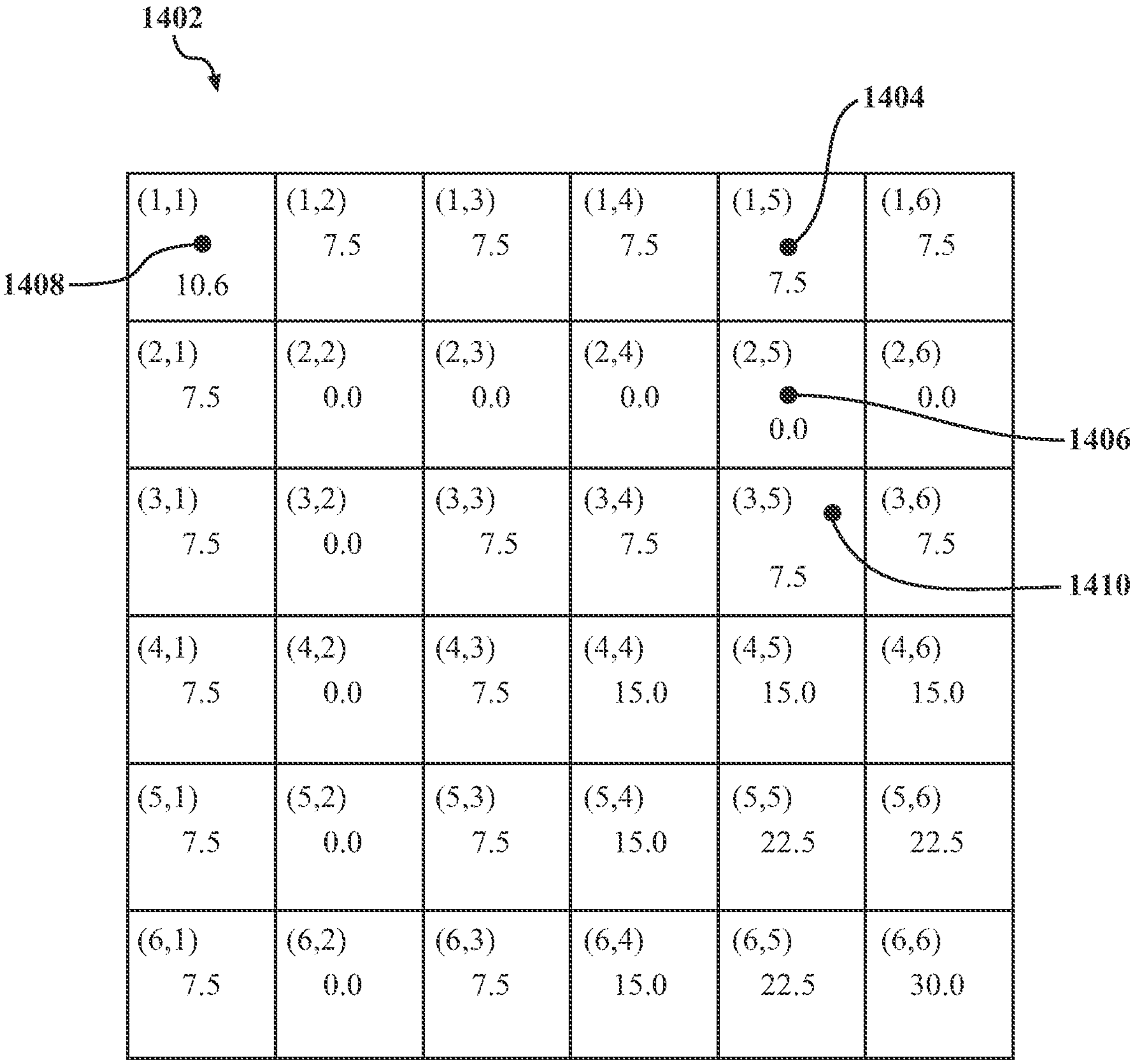
FIG. 14 includes a diagram that illustrates an example of an operation to cause a position of a point, affiliated with a production of a version of the digital map, to move to a position of a pixel on a segmentation map, according to the disclosed technologies.

FIG. 14 includes a diagram 1400 that illustrates an example of an operation to cause a position of a point, affiliated with a production of a version of the digital map, to move to a position of a pixel on a first segmentation map, according to the disclosed technologies. For example, the diagram 1400 can include a portion 1402, of the first segmentation map, affiliated with the region 184 in the aerial image 1100 of the environment 100. For example, the portion 1402 can include a configuration of thirty-six pixels arranged in six rows and six columns. For example, for each pixel, a height of the pixel can represent a distance of 7.5 centimeters and a width of the pixel can represent a distance of 7.5 centimeters.

For example, the configuration can include: (1) a pixel (1, 1) having a value of 10.6, (2) a pixel (1, 2) having a value of 7.5, (3) a pixel (1, 3) having a value of 7.5. (4) a pixel (1, 4) having a value of 7.5, (5) a pixel (1, 5) having a value of 7.5, (6) a pixel (1, 6) having a value of 7.5, (7) a pixel (2, 1) having a value of 7.5, (8) a pixel (2, 2) having a value of 0.0, (9) a pixel (2, 3) having a value of 0.0, (10) a pixel (2, 4) having a value of 0.0, (11) a pixel (2, 5) having a value of 0.0, (12) a pixel (2, 6) having a value of 0.0, (13) a pixel (3, 1) having a value of 7.5, (14) a pixel (3, 2) having a value of 0.0, (15) a pixel (3, 3) having a value of 7.5, (16) a pixel (3, 4) having a value of 7.5, (17) a pixel (3, 5) having a value of 7.5, (18) a pixel (3, 6) having a value of 7.5, (19) a pixel (4, 1) having a value of 7.5, (20) a pixel (4, 2) having a value of 0.0, (21) a pixel (4, 3) having a value of 7.5, (22) a pixel (4, 4) having a value of 15.0, (23) a pixel (4, 5) having a value of 15.0, (24) a pixel (4, 6) having a value of 15.0, (25) a pixel (5, 1) having a value of 7.5, (26) a pixel (5, 2) having a value of 0.0, (27) a pixel (5, 3) having a value of 7.5, (28) a pixel (5, 4) having a value of 15.0), (29) a pixel (5, 5) having a value of 22.5, (30) a pixel (5, 6) having a value of 22.5, (31) a pixel (6, 1) having a value of 7.5, (32) a pixel (6, 2) having a value of 0.0, (33) a pixel (6, 3) having a value of 7.5, (34) a pixel (6, 4) having a value of 15.0, (35) a pixel (6, 5) having a value of 22.5, and (36) a pixel (6, 6) having a value of 30.0.

For example: (1) the pixel (2, 2), the pixel (3, 2), the pixel (4, 2), the pixel (5, 2), and the pixel (6, 2) can be affiliated with positions of a portion of the road boundary 126 and (2) the pixel (2, 2), the pixel (2, 3), the pixel (2, 4), the pixel (2, 5), and the pixel (2, 6) can be affiliated with positions of a portion of the road boundary 158.

For example, a position of a point, affiliated with a production of a version of the digital map, that is a position of a point on a road boundary and that coincides with a position of a center of: (1) the pixel (1, 1) should be moved 10.6 centimeters toward the position of the pixel (2, 2), (2) the pixel (1, 2) should be moved 7.5 centimeters toward the position of the pixel (2, 2), (3) the pixel (1, 3) should be moved 7.5 centimeters toward the position of the pixel (2, 3), (4) the pixel (1, 4) should be moved 7.5 centimeters toward the position of the pixel (2, 4), (5) the pixel (1, 5) should be moved 7.5 centimeters toward the position of the pixel (2, 5), (6) the pixel (1, 6) should be moved 7.5 centimeters toward the position of the pixel (2, 6), (7) the pixel (2, 1) should be moved 7.5 centimeters toward the position of the pixel (2, 2), (8) the pixel (3, 1) should be moved 7.5 centimeters toward the position of the pixel (3, 2), (9) the pixel (3, 3) should be moved 7.5 centimeters toward the position of the pixel (2, 3) or the position of the pixel (3, 2), (10) the pixel (3, 4) should be moved 7.5 centimeters toward the position of the pixel (2, 4), (11) the pixel (3, 5) should be moved 7.5 centimeters toward the position of the pixel (2, 5), (12) the pixel (3, 6) should be moved 7.5 centimeters toward the position of the pixel (2, 6), (13) the pixel (4, 1) should be moved 7.5 centimeters toward the position of the pixel (4, 2), (14) the pixel (4, 3) should be moved 7.5 centimeters toward the position of the pixel (4, 2), (15) the pixel (4, 4) should be moved 15.0 centimeters toward the position of the pixel (2, 4) or the position of the pixel (4, 2), (16) the pixel (4, 5) should be moved 15.0 centimeters toward the position of the pixel (2, 5), (17) the pixel (4, 6) should be moved 15.0 centimeters toward the position of the pixel (2, 6), (18) the pixel (5, 1) should be moved 7.5 centimeters toward the position of the pixel (5, 2), (19) the pixel (5, 3) should be moved 7.5 centimeters toward the position of the pixel (5, 2), (20) the pixel (5, 4) should be moved 15.0 centimeters toward the position of the pixel (5, 2), (21) the pixel (5, 5) should be moved 22.5 centimeters toward the position of the pixel (2, 5) or the position of the pixel (5, 2), (22) the pixel (5, 6) should be moved 22.5 centimeters toward the position of the pixel (2, 6), (23) the pixel (6, 1) should be moved 7.5 centimeters toward the position of the pixel (6, 2), (24) the pixel (6, 3) should be moved 7.5 centimeters toward the position of the pixel (6, 2), (25) the pixel (6, 4) should be moved 15.0 centimeters toward the position of the pixel (6, 2), (26) the pixel (6, 5) should be moved 22.5 centimeters toward the position of the pixel (6, 2), (27) the pixel (6, 6) should be moved 30.0 centimeters toward the position of the pixel (2, 6) or the position of the pixel (6, 2).

For example, the diagram 1400 can also include: (1) a point 1404 at the position 816 of the eighth keypoint 416 determined at the first time ($t_1$), (2) a point 1406 at the position 828 of the eighth keypoint 416 determined at the second time ($t_2$), (3) a point 1408 at the position 846 of the eighth keypoint 416 determined at the third time ($t_3$), and (4) a point 1410 at the position 858 of the eighth keypoint 416 determined at the fourth time ($t_4$).

For example: (1) a position of the point 1404 can coincide with a position of a center of the pixel (1, 5), (2) a position of the point 1406 can coincide with a position of a center of the pixel (2, 5), (3) a position of the point 1408 can coincide with a position of a center of the pixel (1, 1), and (4) a position of the point 1410 can be within the pixel (3, 5) near to the pixel (2, 5), the pixel (2, 6), and the pixel (3, 6).

Accordingly: (1) the position of the point 1404 should be moved 7.5 centimeters toward the position of the pixel (2, 5), (2) the position of the point 1406 should not be moved, and (3) the position of the point 1408 should be moved 10.6 centimeters toward the position of the pixel (2, 2).

In this manner, positions of points, affiliated with the production of the version of the digital map, can be moved by distances to positions that coincides with positions, on the first segmentation mask, of nearest pixels that have the lowest value to produce the aerial image aligned digital map.

Additionally, for example, the instructions to align can further include: (1) instructions to determine, for a second pixel of the all other pixels, a second distance, (2) instructions to change, as a second operation to produce the first segmentation mask, a value for the second pixel from the highest value to a second value that represents the second distance, (3) the instructions to determine, for a third pixel of the all other pixels, a third distance, (4) instructions to change, as a third operation to produce the first segmentation mask, a value for the third pixel from the highest value to a third value that represents the third distance, (5) instructions to determine, for a fourth pixel of the all other pixels, a fourth distance, (6) instructions to change, as a fourth operation to produce the first segmentation mask, a value for the fourth pixel from the highest value to a fourth value that represents the fourth distance, and (7) instructions to determine, as a fifth operation to produce the first segmentation mask, for a specific point within the first pixel, the second pixel, the third pixel, or the fourth pixel, and based on the first value, the second value, the third value, and the fourth value, a corresponding value that represents a corresponding distance between a position at a location represented by the specific point and a position at a location represented by a nearest corresponding pixel that has the lowest value. For example: (1) the second distance can be between a position at a location represented by a center of the second pixel and a position at a location represented by a nearest second pixel that has the lowest value, (2) the third distance can be between a position at a location represented by a center of the third pixel and a position at a location represented by a nearest third pixel that has the lowest value, and (3) the fourth distance can be between a position at a location represented by a center of the fourth pixel and a position at a location represented by a nearest fourth pixel that has the lowest value. For example, the first pixel, the second pixel, the third pixel, and the fourth pixel can be arranged in a configuration having two rows and two columns. For example, the instructions to determine the corresponding value can include instructions to determine, using bilinear interpolation, the corresponding value. For example, the corresponding value, determined using bilinear interpolation, can be a weighted average of: (1) the first value and a distance between the specific point and the center of the first pixel, (2) the second value and a distance between the specific point and the center of the second pixel, (3) the third value and a distance between the specific point and the center of the third pixel, and (4) the fourth value and a distance between the specific point and the center of the fourth pixel. In this manner, a function (i.e., bilinear interpolation) for determining the corresponding value can be a differentiable function. Using a differentiable function can allow instructions to cause the position of the point to move to include at least one SLAM optimization technique.

For example, the position of the point, affiliated with the production of the version of the digital map, can coincide with a position, on the first segmentation mask, of the specific point. For example, the instructions to align can further include instructions to cause, as an operation to produce the aerial image aligned digital map, the position of the point, affiliated with the production of the version of the digital map, to move by the corresponding distance to a position that coincides with the position, on the first segmentation mask, of the nearest corresponding pixel that has the lowest value.

With reference to FIG. 14, for example, the specific point can be the point 1410. For example, the first pixel can be the pixel (2, 5), the second pixel can be the pixel (2, 6), the third pixel can be the pixel (3, 5), and the fourth pixel can be the pixel (3, 6). For example, the corresponding value can be based on the values of 0.0, 0.0, 7.5, and 7.5. For example, the corresponding value can be determined using bipolar interpolation. For example, the corresponding value, determined using bilinear interpolation, can be a weighted average of: (1) the first value (0.0) and a distance between the point 1410 and the center of the pixel (2, 5), (2) the second value (0.0) and a distance between the point 1410 and the center of the pixel (2, 6), (3) the third value (7.5) and a distance between the point 1410 and the center of the pixel (3, 5), and (4) the fourth value (7.5) and a distance between the point 1410 and the center of the pixel (3, 6). The position of the point 1410 should be moved by the corresponding distance (represented by the corresponding value) toward the position of the pixel (2, 5).

Additionally, for example, the instructions to align can further be with respect to lane boundaries. For example, the instructions to align can further include: (1) instructions to detect, within a second copy of the aerial image, indications of lane boundaries on improved surfaces for use by vehicles and pedestrians (e.g., drivable surfaces (e.g., roads)), (2) instructions to cause each pixel, in the second copy of the aerial image, affiliated with the lane boundaries to have the lowest value to produce a second modified aerial image, (3) instructions to cause all other pixels, in the second modified aerial image, to have the highest value, (4) instructions to determine, for a specific pixel of the all other pixels in the second modified aerial image, a specific distance, and (5) instructions to change, as an operation to produce a second segmentation mask, a value for the specific pixel from the highest value to a specific value that represents the specific distance. For example, the specific distance can be between a position at a location represented by a center of the specific pixel and a position at a location represented by a nearest pixel that has the lowest value.

For example, the position of the point, affiliated with the production of the version of the digital map, can be a position of a point on the lane boundary and can coincide with the position, on the second segmentation mask, of the specific pixel. For example, the instructions to align can further include instructions to cause, as an operation to produce the aerial image aligned digital map, the position of the point, affiliated with the production of the version of the digital map, to move by the specific distance to a position that coincides with the position, on the second segmentation mask, of the nearest pixel that has the lowest value.

Alternatively, for example, the instructions to align can be with respect to lane boundaries (e.g., without concern for road boundaries). For example, the instructions to align can include: (1) instructions to detect, within the aerial image, indications of lane boundaries on improved surfaces for use by vehicles and pedestrians (e.g., drivable surfaces (e.g., roads)), (2) instructions to cause each pixel, in the aerial image, affiliated with the lane boundaries to have a lowest value to produce a modified aerial image, (3) instructions to cause all other pixels, in the modified aerial image, to have a highest value, (4) instructions to determine, for a pixel of the all other pixels, a distance, and (5) instructions to change, as an operation to produce a segmentation mask, a value for the pixel from the highest value to a value that represents the distance. For example, the distance can be between a position at a location represented by a center of the pixel and a position at a location represented by a nearest pixel that has the lowest value.

For example, the position of the point, affiliated with the production of the version of the digital map, can be a position of a point on the lane boundary and can coincide with the position, on the segmentation mask, of the pixel. For example, the instructions to align can further include instructions to cause, as an operation to produce the aerial image aligned digital map, the position of the point, affiliated with the production of the version of the digital map, to move by the distance to a position that coincides with the position, on the segmentation mask, of the nearest pixel that has the lowest value.

Figure 15:
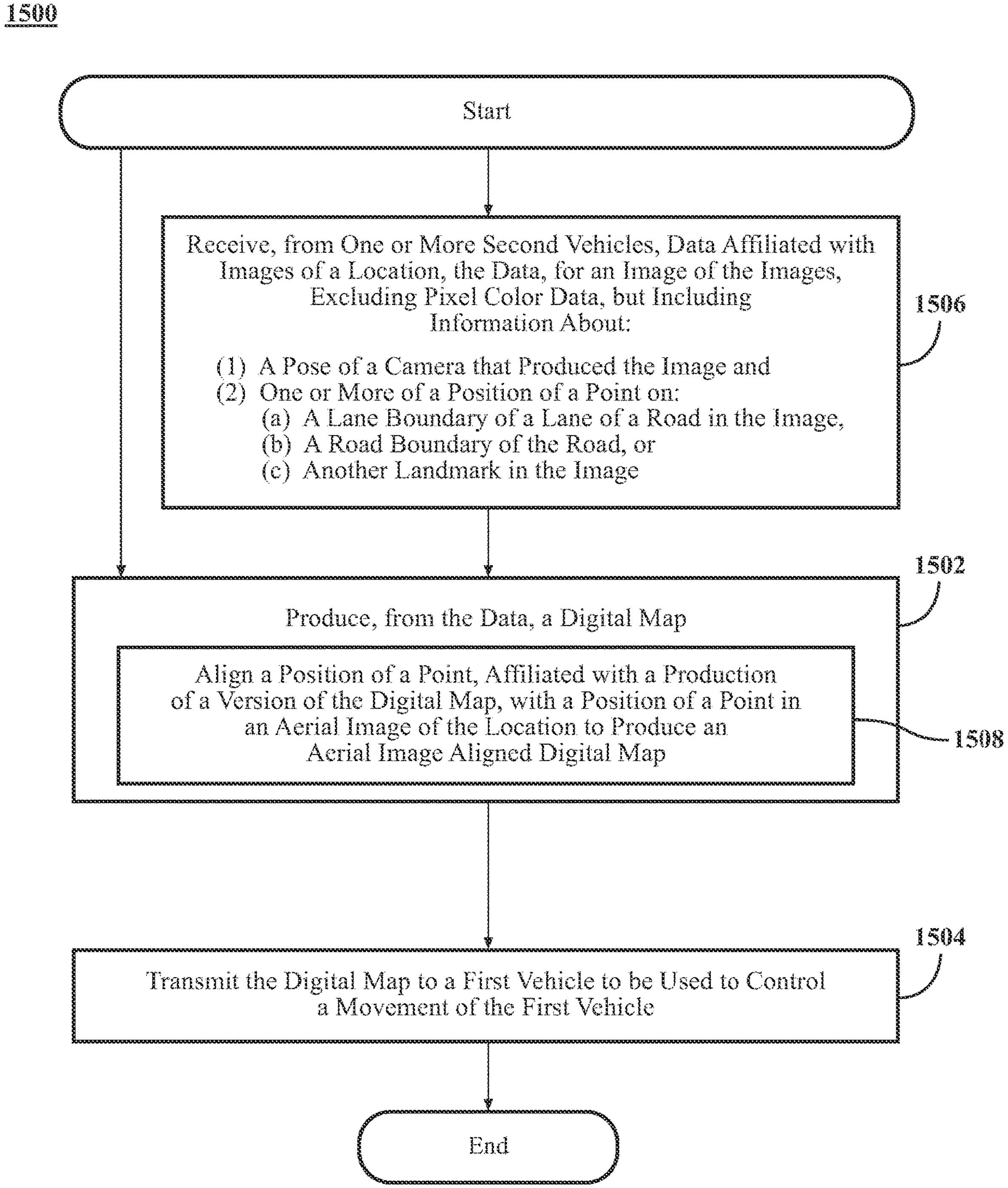
FIG. 15 includes a flow diagram that illustrates an example of a method that is associated with producing, from data affiliated with images of a location, but excluding pixel color data, a digital map of the location, according to the disclosed technologies.

FIG. 15 includes a flow diagram that illustrates an example of a method 1500 that is associated with producing, from data affiliated with images of a location, but excluding pixel color data, a digital map of the location, according to the disclosed technologies. Although the method 1500 is described in combination with the system 700 illustrated in FIG. 7, one of skill in the art understands, in light of the description herein, that the method 1500 is not limited to being implemented by the system 700 illustrated in FIG. 7. Rather, the system 700 illustrated in FIG. 7 is an example of a system that may be used to implement the method 1500. Additionally, although the method 1500 is illustrated as a generally serial process, various aspects of the method 1500 may be able to be executed in parallel.

In the method 1500, at an operation 1502, for example, the production module 706 can produce, from the data, the digital map. The data, for an image of the images, can exclude pixel color data, but can include information about: (1) a pose of a camera that produced the image and (2) one or more of a position of a point on: (a) a lane boundary of a lane of a road in the image, (b) a road boundary of the road, or (c) another landmark in the image.

For example, one or more of the positions of the point on the lane boundary, the road boundary, or the landmark can be affiliated with a position of a keypoint of an object, in the image, that represents the lane boundary, the road boundary, or the landmark.

For example, the landmark can be a sign. For example, the data affiliated with the images can include information about the sign. For example, the information about the sign can include: (1) for a center of the sign, a latitude position, a longitude position, and an altitude, (2) a height of the sign, and (3) a width of the sign. Additionally or alternatively, for example, the information about the sign can include information about a message communicated by the sign.

At an operation 1504, for example, the communications module 708 can transmit the digital map to a first vehicle to be used to control a movement of the first vehicle.

Additionally, at an operation 1506, for example, the communications module 708 can receive, from one or more second vehicles, the data affiliated with the images. (For example, the camera can include one or more cameras and the one or more cameras can be attached to the one or more second vehicles.)

For example, a camera, of the one or more cameras, can be a component in a lane keeping assist (LKA) system. For example, the images can be produced at a specific production rate. For example, the specific production rate can be ten hertz. For example, an amount of the data, for an image, can be less than a threshold amount. For example, the threshold amount can be 300 bytes. For example, the data affiliated with the images can be produced by an automated driving system of active safety technologies and advanced driver assistance systems (ADAS). For example, the automated driving system can be a third generation of the Toyota Safety Sense™ system (TSS3).

For example: (1) the operation 1506, by the system 700 (e.g., the system 180 illustrated in FIG. 1), can occur at a first time, (2) the operation 1502, by the system 700 (e.g., the system 180 illustrated in FIG. 1), can occur at a second time, and (3) a difference between the first time and the second time can be less than a specific duration of time. For example, the specific duration of time can be thirty minutes.

For example, in the operation 1506, the communications module 708 can receive, from a vehicle of the one or more second vehicles and at a specific communication rate, a transmission of a batch of the data affiliated with the images produced by a corresponding camera in a duration of time affiliated with the specific communication rate. For example, the specific communication rate can be once per thirty seconds.

For example, in the operation 1502, the production module 706 can process, using one or more data association operations, the data affiliated with the images to determine correspondence of the position of the point affiliated with a specific object, included in a first image of the images, with the position of the point affiliated with the specific object included in a second image of the images.

For example, in the operation 1502, the production module 706 can: (1) group the images into keyframes and (2) process, using one or more simultaneous localization and mapping (SLAM) optimization techniques, the keyframes. For example: (1) a first keyframe, of the keyframes, can be characterized by a first measure, (2) a second keyframe, of the keyframes, can be characterized by a second measure, and (3) a difference between the first measure and the second measure can be greater than a threshold. For example, the first measure can be of values of the data included in the first keyframe and the second measure can be of values of the data included in the second keyframe. More generally, for example, a count of the images included in a keyframe, of the keyframes, can be a function of a distance traveled by a vehicle that produced the images.

For example, in the operation 1502, the production module 706 can process, using one or more SLAM techniques, the data affiliated with the images of the location. For example, the location can be a specific region. Advantageously, processing the data for a specific region can limit a number of data association operations to be performed to produce the digital map of the location. For example, a shape of the specific region can be defined by seven regular hexagons arranged with one hexagon, of the seven regular hexagons, in a center position and another hexagon, of the seven regular hexagons, disposed on a side of the one hexagon. For example, each side of the one hexagon in the center position can be directly adjacent to a side of another hexagon. In this manner, the specific region can be a region in a hexagonal grid. Advantageously, use of a hexagonal grid can simplify calculations as the digital map is built out beyond the specific region. A distance between a center of a specific hexagon and a center of any adjacent hexagon can be the same as a distance between the center of the specific hexagon and a center of any other adjacent hexagon. In contrast, for a square grid, calculations for a distance between a center of a specific square and a center of any adjacent square can require consideration about whether the center of the adjacent square is orthogonal or diagonal to the center of the specific square. Additionally, advantageously, as the digital map is built out beyond the specific region, a hexagonal grid conforms better to a surface of a sphere (e.g., a globe) than a square grid.

Additionally, at an operation 1508, for example, the alignment submodule 710 can align the position of the point, affiliated with a production of a version of the digital map, with a position of a point in an aerial image of the location to produce an aerial image aligned digital map. For example, the aerial image can be a satellite image. Alternatively, for example, the aerial image can be produced by a camera associated with an aircraft.

For example, in the operation 1508, the alignment submodule 710 can align, to correct for an error in one or more of proprioception information or perceptual information used by one or more SLAM techniques, the position of the point, affiliated with the production of the version of the digital map, with the position of the point in the aerial image to produce the aerial image aligned digital map.

FIGS. 16A-16D include a flow diagram that illustrates a first example of a method 1600 that is associated with aligning a position of a point, affiliated with a production of a version of the digital map of a location, with a position of a point in an aerial image of the location to produce an aerial image aligned digital map of the location, according to the disclosed technologies. Although the method 1600 is described in combination with the system 700 illustrated in FIG. 7, one of skill in the art understands, in light of the description herein, that the method 1600 is not limited to being implemented by the system 700 illustrated in FIG. 7. Rather, the system 700 illustrated in FIG. 7 is an example of a system that may be used to implement the method 1600. Additionally, although the method 1600 is illustrated as a generally serial process, various aspects of the method 1600 may be able to be executed in parallel.

Figure 16A:
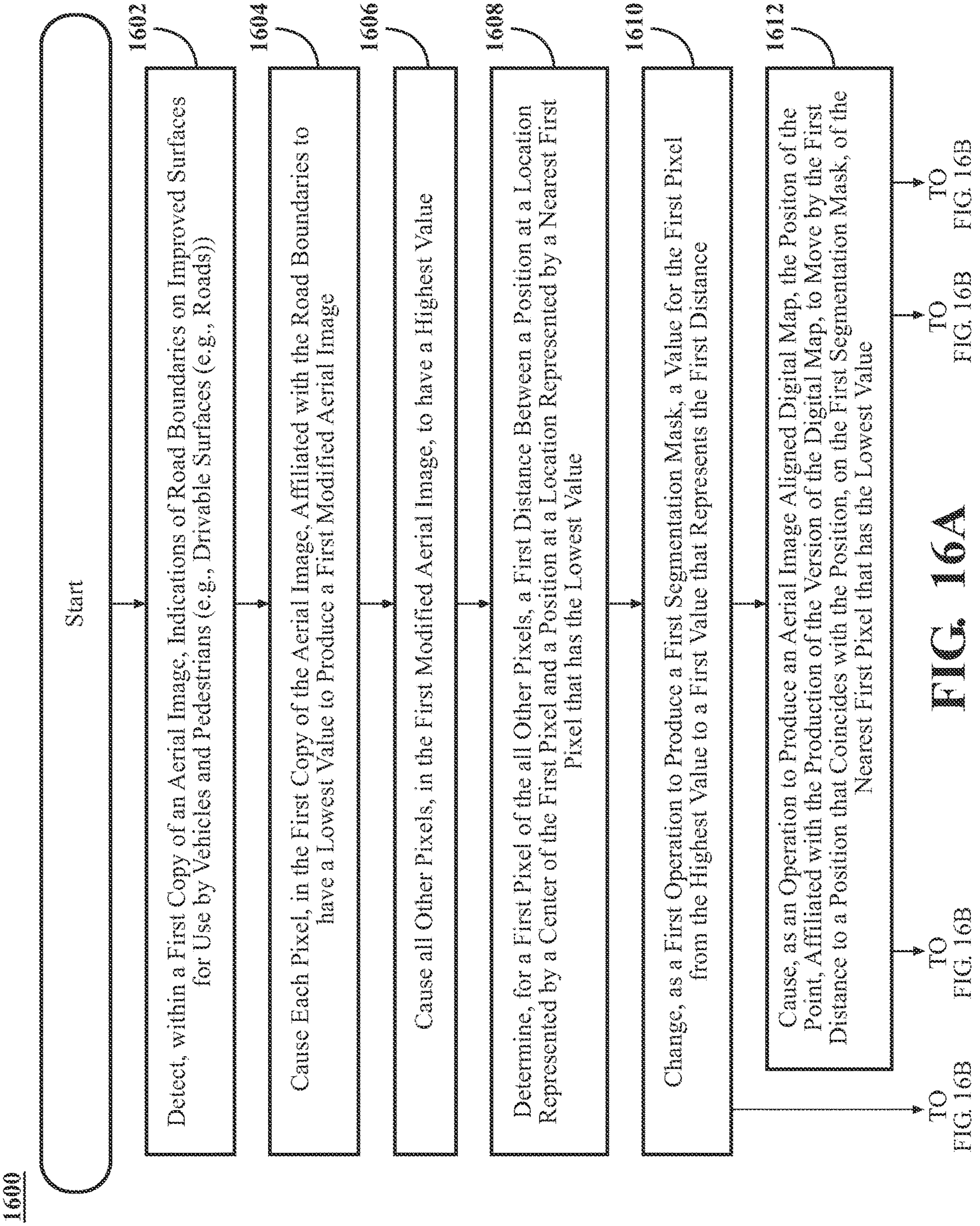
FIGS. 16A-16D include a flow diagram that illustrates a first example of a method that is associated with aligning a position of a point, affiliated with a production of a version of the digital map of a location, with a position of a point in an aerial image of the location to produce an aerial image aligned digital map of the location, according to the disclosed technologies.

In FIG. 16A, in the method 1600, at an operation 1602, for example, the alignment submodule 710 can detect, within a first copy of the aerial image, indications of road boundaries on improved surfaces for use by vehicles and pedestrians (e.g., drivable surfaces (e.g., roads)).

Figure 17:
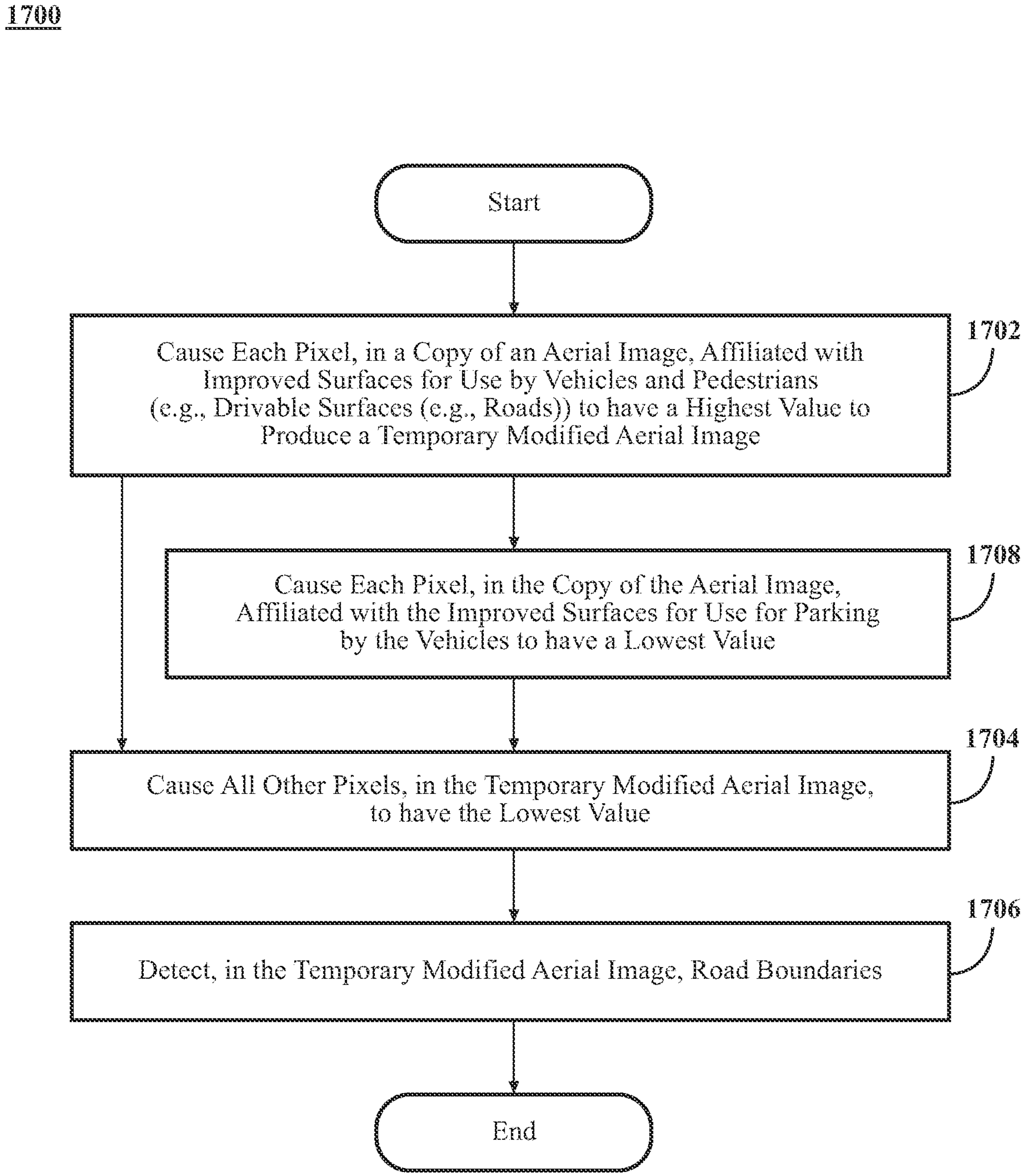
FIG. 17 includes a flow diagram that illustrates an example of a method that is associated with detecting, within a copy of an aerial image, indications of road boundaries on improved surfaces for use by vehicles and pedestrians, according to the disclosed technologies.

FIG. 17 includes a flow diagram that illustrates an example of a method 1700 that is associated with detecting, within a copy of an aerial image, indications of road boundaries on improved surfaces for use by vehicles and pedestrians, according to the disclosed technologies. Although the method 1700 is described in combination with the system 700 illustrated in FIG. 7, one of skill in the art understands, in light of the description herein, that the method 1700 is not limited to being implemented by the system 700 illustrated in FIG. 7. Rather, the system 700 illustrated in FIG. 7 is an example of a system that may be used to implement the method 1700. Additionally, although the method 1700 is illustrated as a generally serial process, various aspects of the method 1700 may be able to be executed in parallel.

In the method 1700, at an operation 1702, for example, the alignment submodule 710 can cause each pixel, in the copy of the aerial image, affiliated with the improved surfaces to have a highest value to produce a temporary modified aerial image.

At an operation 1704, for example, the alignment submodule 710 can cause all other pixels, in the temporary modified aerial image, to have a lowest value.

At an operation 1706, for example, the alignment submodule 710 can detect, in the temporary modified aerial image, the road boundaries.

Additionally, at an operation 1708, for example, the alignment submodule 710 can cause each pixel, in the copy of the aerial image, affiliated with the improved surfaces for use for parking by the vehicles to have the lowest value.

Returning to FIG. 16A, in the method 1600, at an operation 1604, for example, the alignment submodule 710 can cause each pixel, in the first copy of the aerial image, affiliated with the road boundaries to have a lowest value to produce a first modified aerial image.

At an operation 1606, for example, the alignment submodule 710 can cause all other pixels, in the first modified aerial image, to have a highest value.

At an operation 1608, for example, the alignment submodule 710 can determine, for a first pixel of the all other pixels, a first distance.

At an operation 1610, for example, the alignment submodule 710 can change, as a first operation to produce a first segmentation mask, a value for the first pixel from the highest value to a first value that represents the first distance. For example, the first distance can be between a position at a location represented by a center of the first pixel and a position at a location represented by a nearest first pixel that has the lowest value.

For example, the position of the point, affiliated with the production of the version of the digital map, can be a position of a point on the road boundary and can coincide with a position, on the first segmentation mask, of the first pixel. Additionally, at an operation 1612, for example, the alignment submodule 710 can cause, as an operation to produce the aerial image aligned digital map, the position of the point, affiliated with the production of the version of the digital map, to move by the first distance to a position that coincides with the position, on the first segmentation mask, of the nearest first pixel that has the lowest value.

Figure 16B:
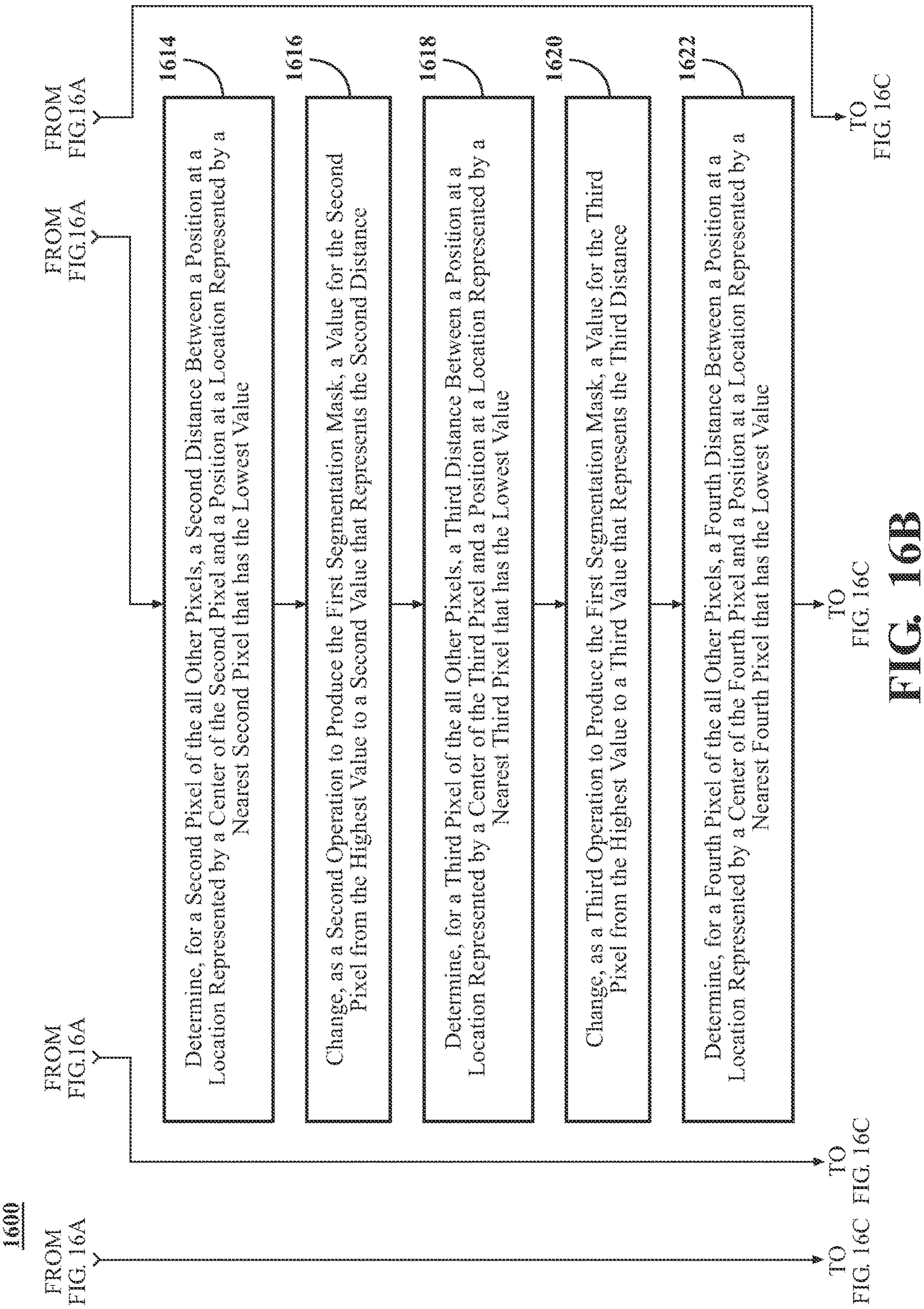

Additionally, in FIG. 16B, in the method 1600, at an operation 1614, for example, the alignment submodule 710 can determine, for a second pixel of the all other pixels, a second distance.

Additionally, at an operation 1616, for example, the alignment submodule 710 can change, as a second operation to produce the first segmentation mask, a value for the second pixel from the highest value to a second value that represents the second distance.

Additionally, at an operation 1618, for example, the alignment submodule 710 can determine, for a third pixel of the all other pixels, a third distance.

Additionally, at an operation 1620, for example, the alignment submodule 710 can change, as a third operation to produce the first segmentation mask, a value for the third pixel from the highest value to a third value that represents the third distance.

Additionally, at an operation 1622, for example, the alignment submodule 710 can determine, for a fourth pixel of the all other pixels, a fourth distance.

Figure 16C:
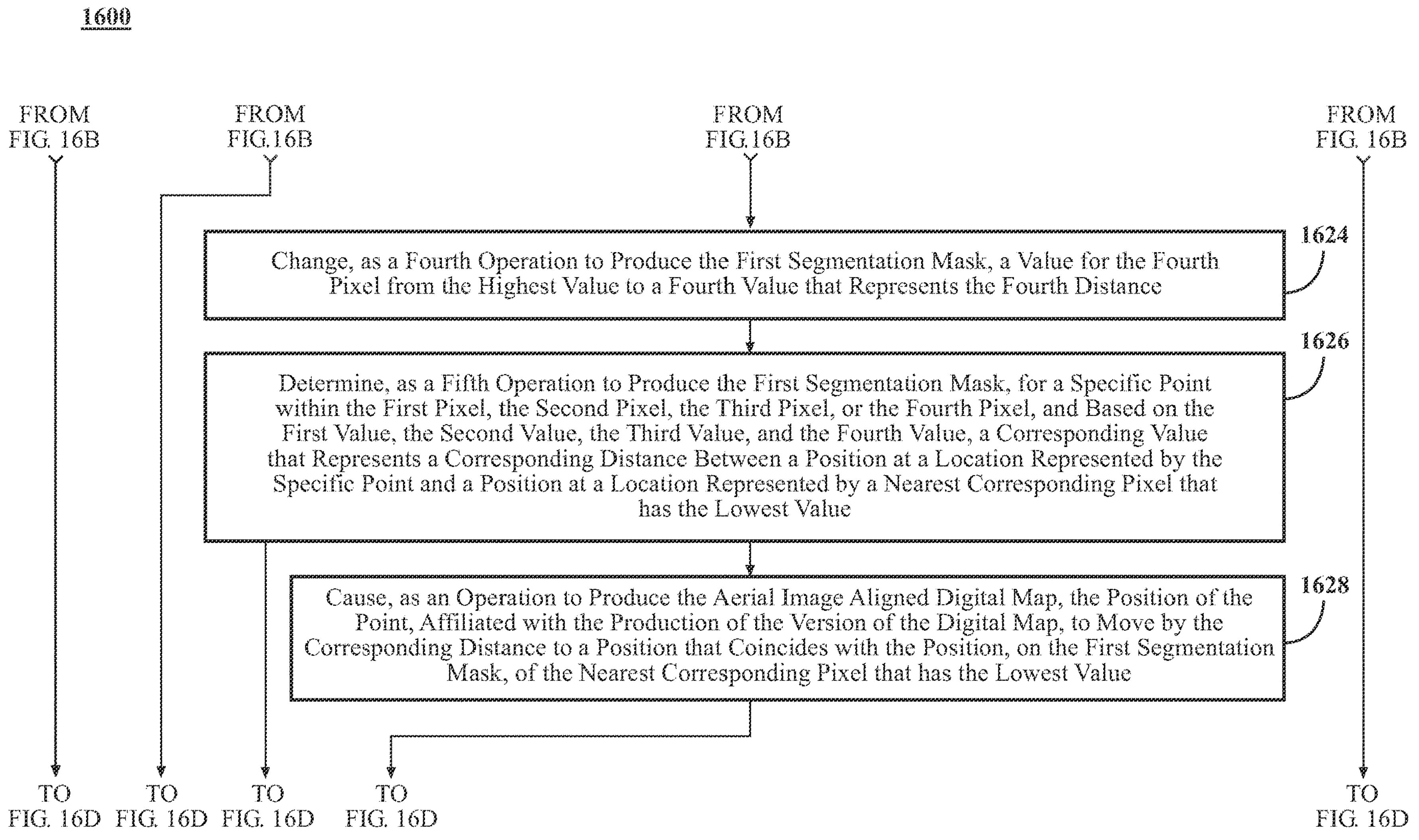

Additionally, in FIG. 16C, in the method 1600, at an operation 1624, for example, the alignment submodule 710 can change, as a fourth operation to produce the first segmentation mask, a value for the fourth pixel from the highest value to a fourth value that represents the fourth distance.

Additionally, at an operation 1626, for example, the alignment submodule 710 can determine, as a fifth operation to produce the first segmentation mask, for a specific point within the first pixel, the second pixel, the third pixel, or the fourth pixel, and based on the first value, the second value, the third value, and the fourth value, a corresponding value that represents a corresponding distance between a position at a location represented by the specific point and a position at a location represented by a nearest corresponding pixel that has the lowest value. For example: (1) the second distance can be between a position at a location represented by a center of the second pixel and a position at a location represented by a nearest second pixel that has the lowest value, (2) the third distance can be between a position at a location represented by a center of the third pixel and a position at a location represented by a nearest third pixel that has the lowest value, and (3) the fourth distance can be between a position at a location represented by a center of the fourth pixel and a position at a location represented by a nearest fourth pixel that has the lowest value. For example, the first pixel, the second pixel, the third pixel, and the fourth pixel can be arranged in a configuration having two rows and two columns. For example, the instructions to determine the corresponding value can include instructions to determine, using bilinear interpolation, the corresponding value.

For example, the position of the point, affiliated with the production of the version of the digital map, can coincide with a position, on the first segmentation mask, of the specific point. Additionally, at an operation 1628, for example, the alignment submodule 710 can cause, as an operation to produce the aerial image aligned digital map, the position of the point, affiliated with the production of the version of the digital map, to move by the corresponding distance to a position that coincides with the position, on the first segmentation mask, of the nearest corresponding pixel that has the lowest value.

Figure 16D:
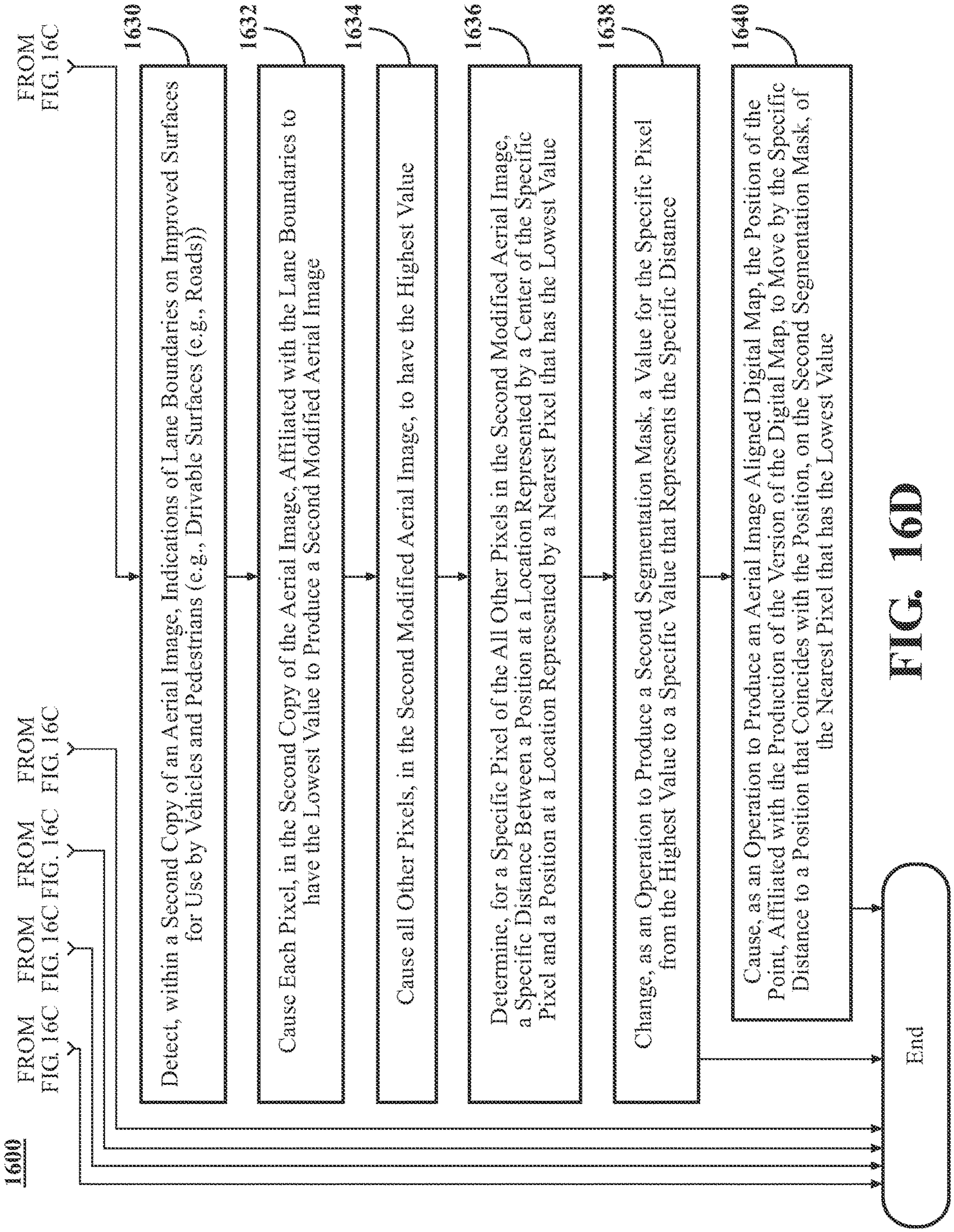

Additionally, in FIG. 16D, in the method 1600, at an operation 1630, for example, the alignment submodule 710 can detect, within a second copy of the aerial image, indications of lane boundaries on improved surfaces for use by vehicles and pedestrians (e.g., drivable surfaces (e.g., roads)).

Additionally, at an operation 1632, for example, the alignment submodule 710 can cause each pixel, in the second copy of the aerial image, affiliated with the lane boundaries to have the lowest value to produce a second modified aerial image.

Additionally, at an operation 1634, for example, the alignment submodule 710 can cause all other pixels, in the second modified aerial image, to have the highest value.

Additionally, at an operation 1636, for example, the alignment submodule 710 can determine, for a specific pixel of the all other pixels in the second modified aerial image, a specific distance. For example, the specific distance can be between a position at a location represented by a center of the specific pixel and a position at a location represented by a nearest pixel that has the lowest value.

Additionally, at an operation 1638, for example, the alignment submodule 710 can change, as an operation to produce a second segmentation mask, a value for the specific pixel from the highest value to a specific value that represents the specific distance.

For example, the position of the point, affiliated with the production of the version of the digital map, can be a position of a point on the lane boundary and can coincide with the position, on the second segmentation mask, of the specific pixel. Additionally, at an operation 1640, for example, the alignment submodule 710 can cause, as an operation to produce the aerial image aligned digital map, the position of the point, affiliated with the production of the version of the digital map, to move by the specific distance to a position that coincides with the position, on the second segmentation mask, of the nearest pixel that has the lowest value.

Figure 18:
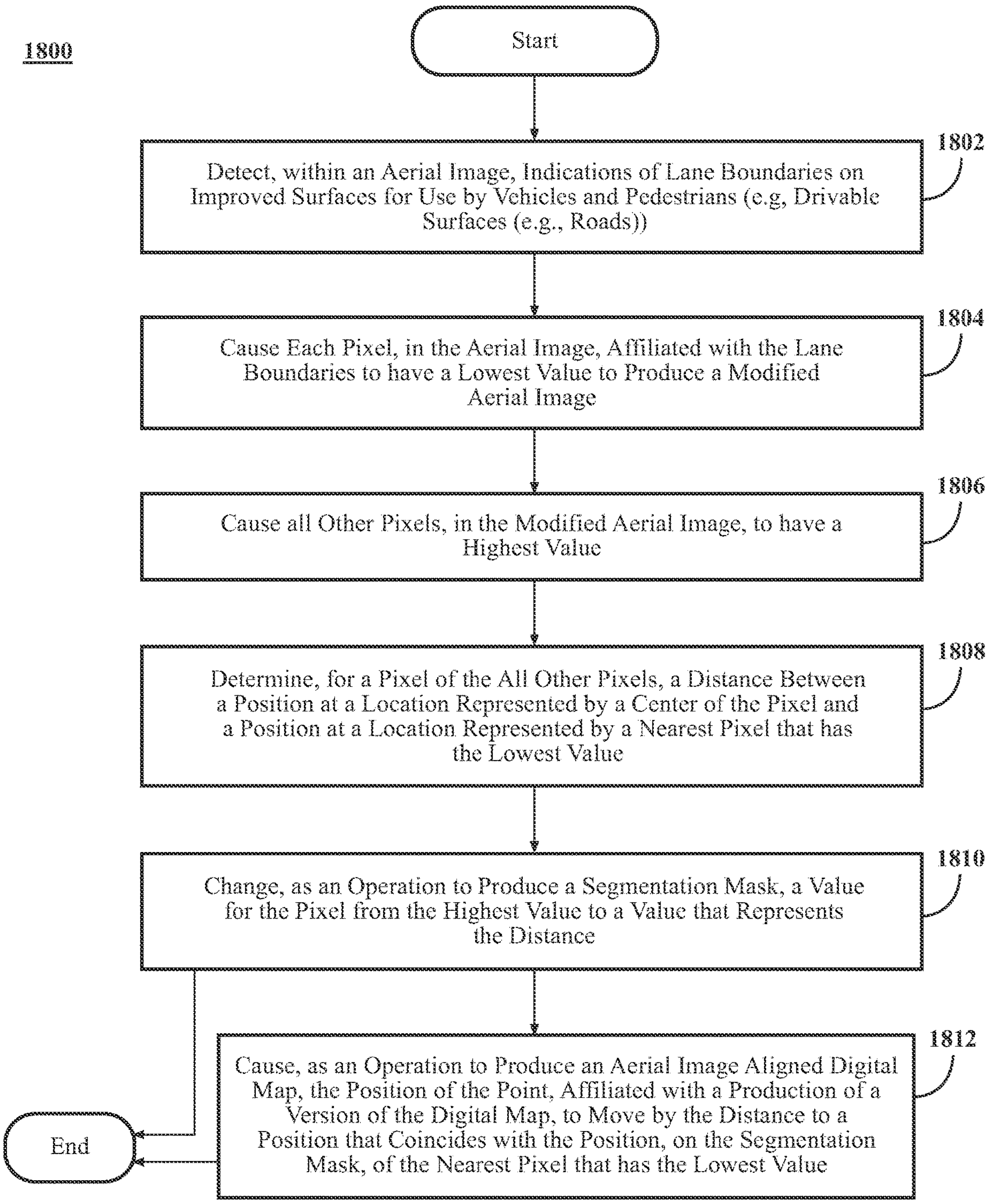
FIG. 18 includes a flow diagram that illustrates a second example of a method that is associated with aligning a position of a point, affiliated with a production of a version of the digital map of a location, with a position of a point in an aerial image of the location to produce an aerial image aligned digital map of the location, according to the disclosed technologies.

FIG. 18 includes a flow diagram that illustrates a second example of a method 1800 that is associated with aligning a position of a point, affiliated with a production of a version of the digital map of a location, with a position of a point in an aerial image of the location to produce an aerial image aligned digital map of the location, according to the disclosed technologies. Although the method 1800 is described in combination with the system 700 illustrated in FIG. 7, one of skill in the art understands, in light of the description herein, that the method 1800 is not limited to being implemented by the system 700 illustrated in FIG. 7. Rather, the system 700 illustrated in FIG. 7 is an example of a system that may be used to implement the method 1800. Additionally, although the method 1800 is illustrated as a generally serial process, various aspects of the method 1800 may be able to be executed in parallel.

In the method 1800, at an operation 1802, for example, the alignment submodule 710 can detect, within the aerial image, indications of lane boundaries on improved surfaces for use by vehicles and pedestrians (e.g., drivable surfaces (e.g., roads)).

At an operation 1804, for example, the alignment submodule 710 can cause each pixel, in the aerial image, affiliated with the lane boundaries to have a lowest value to produce a modified aerial image.

At an operation 1806, for example, the alignment submodule 710 can cause all other pixels, in the modified aerial image, to have a highest value.

At an operation 1808, for example, the alignment submodule 710 can determine, for a pixel of the all other pixels, a distance.

At an operation 1810, for example, the alignment submodule 710 can change, as an operation to produce a segmentation mask, a value for the pixel from the highest value to a value that represents the distance. For example, the distance can be between a position at a location represented by a center of the pixel and a position at a location represented by a nearest pixel that has the lowest value.

For example, the position of the point, affiliated with the production of the version of the digital map, can be a position of a point on the lane boundary and can coincide with the position, on the segmentation mask, of the pixel. Additionally, at an operation 1812, for example, the alignment submodule 710 can cause, as an operation to produce the aerial image aligned digital map, the position of the point, affiliated with the production of the version of the digital map, to move by the distance to a position that coincides with the position, on the segmentation mask, of the nearest pixel that has the lowest value.

Figure 19:
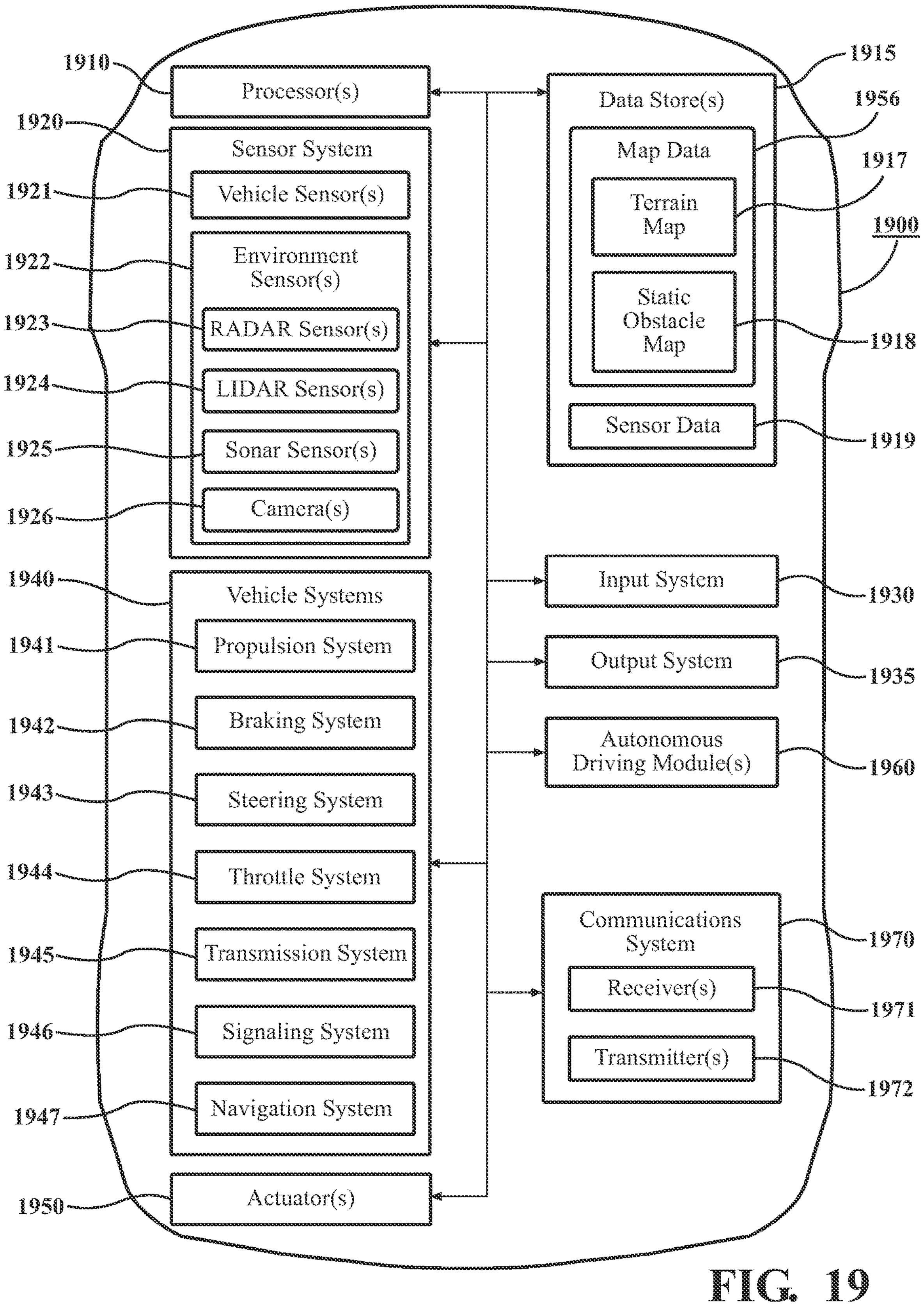
FIG. 19 includes a block diagram that illustrates an example of elements disposed on a vehicle, according to the disclosed technologies.

FIG. 19 includes a block diagram that illustrates an example of elements disposed on a vehicle 1900, according to the disclosed technologies. As used herein, a "vehicle" can be any form of powered transport. In one or more implementations, the vehicle 1900 can be an automobile. While arrangements described herein are with respect to automobiles, one of skill in the art understands, in light of the description herein, that embodiments are not limited to automobiles. For example, functions and/or operations of one or more of the first vehicle 164 (illustrated in FIG. 1), the second vehicle 166 (illustrated in FIG. 1), or the third vehicle 168 (illustrated in FIG. 1) can be realized by the vehicle 1900.

In some embodiments, the vehicle 1900 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 1900 is performed according to inputs received from a user (e.g., human driver). In one or more arrangements, the vehicle 1900 can be a conventional vehicle that is configured to operate in only a manual mode.

In one or more embodiments, the vehicle 1900 can be an automated vehicle. As used herein, "automated vehicle" can refer to a vehicle that operates in an automated mode. As used herein, "automated mode" can refer to navigating and/or maneuvering the vehicle 1900 along a travel route using one or more computing systems to control the vehicle 1900 with minimal or no input from a human driver. In one or more embodiments, the vehicle 1900 can be highly automated or completely automated. In one embodiment, the vehicle 1900 can be configured with one or more semi-automated operational modes in which one or more computing systems perform a portion of the navigation and/or maneuvering of the vehicle along a travel route, and a vehicle operator (i.e., driver) provides inputs to the vehicle 1900 to perform a portion of the navigation and/or maneuvering of the vehicle 1900 along a travel route.

For example, Standard J3016 202104, Taxonomy and Definitions for Terms Related to Driving Automation Systems for On-Road Motor Vehicles, issued by the Society of Automotive Engineers (SAE) International on Jan. 16, 2014, and most recently revised on Apr. 30, 2021, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 1900 can include various elements. The vehicle 1900 can have any combination of the various elements illustrated in FIG. 19. In various embodiments, it may not be necessary for the vehicle 1900 to include all of the elements illustrated in FIG. 19. Furthermore, the vehicle 1900 can have elements in addition to those illustrated in FIG. 19. While the various elements are illustrated in FIG. 19 as being located within the vehicle 1900, one or more of these elements can be located external to the vehicle 1900. Furthermore, the elements illustrated may be physically separated by large distances. For example, as described, one or more components of the disclosed system can be implemented within the vehicle 1900 while other components of the system can be implemented within a cloud-computing environment, as described below. For example, the elements can include one or more processors 1910, one or more data stores 1915, a sensor system 1920, an input system 1930, an output system 1935, vehicle systems 1940, one or more actuators 1950, one or more automated driving modules 1960, a communications system 1970.

In one or more arrangements, the one or more processors 1910 can be a main processor of the vehicle 1900. For example, the one or more processors 1910 can be an electronic control unit (ECU).

The one or more data stores 1915 can store, for example, one or more types of data. The one or more data stores 1915 can include volatile memory and/or non-volatile memory. Examples of suitable memory for the one or more data stores 1915 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 1915 can be a component of the one or more processors 1910. Additionally or alternatively, the one or more data stores 1915 can be operatively connected to the one or more processors 1910 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 1915 can store map data 1916. The map data 1916 can include maps of one or more geographic areas. In some instances, the map data 1916 can include information or data on roads, traffic control devices, road markings, structures, features, and/or landmarks in the one or more geographic areas. The map data 1916 can be in any suitable form. In some instances, the map data 1916 can include aerial views of an area. In some instances, the map data 1916 can include ground views of an area, including 360-degree ground views. The map data 1916 can include measurements, dimensions, distances, and/or information for one or more items included in the map data 1916 and/or relative to other items included in the map data 1916. The map data 1916 can include a digital map with information about road geometry. The map data 1916 can be high quality and/or highly detailed. For example, functions and/or operations of one or more of the digital map 900 (illustrated in FIG. 9) can be realized by the map data 1916.

In one or more arrangements, the map data 1916 can include one or more terrain maps 1917. The one or more terrain maps 1917 can include information about the ground, terrain, roads, surfaces, and/or other features of one or more geographic areas. The one or more terrain maps 1917 can include elevation data of the one or more geographic areas. The map data 1916 can be high quality and/or highly detailed. The one or more terrain maps 1917 can define one or more ground surfaces, which can include paved roads, unpaved roads, land, and other things that define a ground surface.

In one or more arrangements, the map data 1916 can include one or more static obstacle maps 1918. The one or more static obstacle maps 1918 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 1918 can have location data, size data, dimension data, material data, and/or other data associated with them. The one or more static obstacle maps 1918 can include measurements, dimensions, distances, and/or information for one or more static obstacles. The one or more static obstacle maps 1918 can be high quality and/or highly detailed. The one or more static obstacle maps 1918 can be updated to reflect changes within a mapped area.

In one or more arrangements, the one or more data stores 1915 can store sensor data 1919. As used herein, "sensor data" can refer to any information about the sensors with which the vehicle 1900 can be equipped including the capabilities of and other information about such sensors. The sensor data 1919 can relate to one or more sensors of the sensor system 1920. For example, in one or more arrangements, the sensor data 1919 can include information about one or more lidar sensors 1924 of the sensor system 1920.

In some arrangements, at least a portion of the map data 1916 and/or the sensor data 1919 can be located in one or more data stores 1915 that are located onboard the vehicle 1900. Additionally or alternatively, at least a portion of the map data 1916 and/or the sensor data 1919 can be located in one or more data stores 1915 that are located remotely from the vehicle 1900.

The sensor system 1920 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 1920 includes a plurality of sensors, the sensors can work independently from each other. Alternatively, two or more of the sensors can work in combination with each other. In such a case, the two or more sensors can form a sensor network. The sensor system 1920 and/or the one or more sensors can be operatively connected to the one or more processors 1910, the one or more data stores 1915, and/or another element of the vehicle 1900 (including any of the elements illustrated in FIG. 19). The sensor system 1920 can acquire data of at least a portion of the external environment of the vehicle 1900 (e.g., nearby vehicles). The sensor system 1920 can include any suitable type of sensor. Various examples of different types of sensors are described herein. However, one of skill in the art understands that the embodiments are not limited to the particular sensors described herein.

The sensor system 1920 can include one or more vehicle sensors 1921. The one or more vehicle sensors 1921 can detect, determine, and/or sense information about the vehicle 1900 itself. In one or more arrangements, the one or more vehicle sensors 1921 can be configured to detect and/or sense position and orientation changes of the vehicle 1900 such as, for example, based on inertial acceleration. In one or more arrangements, the one or more vehicle sensors 1921 can include one or more accelerometers, one or more gyroscopes, an inertial measurement unit (IMU), a dead-reckoning system, a global navigation satellite system (GNSS), a global positioning system (GPS), a navigation system 1947, and/or other suitable sensors. The one or more vehicle sensors 1921 can be configured to detect and/or sense one or more characteristics of the vehicle 1900. In one or more arrangements, the one or more vehicle sensors 1921 can include a speedometer to determine a current speed of the vehicle 1900.

Additionally or alternatively, the sensor system 1920 can include one or more environment sensors 1922 configured to acquire and/or sense driving environment data. As used herein, "driving environment data" can include data or information about the external environment in which a vehicle is located or one or more portions thereof. For example, the one or more environment sensors 1922 can be configured to detect, quantify, and/or sense obstacles in at least a portion of the external environment of the vehicle 1900 and/or information/data about such obstacles. Such obstacles may be stationary objects and/or dynamic objects. The one or more environment sensors 1922 can be configured to detect, measure, quantify, and/or sense other things in the external environment of the vehicle 1900 such as, for example, lane markers, signs, traffic lights, traffic signs, lane lines, crosswalks, curbs proximate the vehicle 1900, off-road objects, etc.

Various examples of sensors of the sensor system 1920 are described herein. The example sensors may be part of the one or more vehicle sensors 1921 and/or the one or more environment sensors 1922. However, one of skill in the art understands that the embodiments are not limited to the particular sensors described.

In one or more arrangements, the one or more environment sensors 1922 can include one or more radar sensors 1923, one or more lidar sensors 1924, one or more sonar sensors 1925, and/or one more cameras 1926. In one or more arrangements, the one or more cameras 1926 can be one or more high dynamic range (HDR) cameras or one or more infrared (IR) cameras. For example, the one or more cameras 1926 can be used to record a reality of a state of an item of information that can appear in the digital map. For example, functions and/or operations of the forward-facing camera 170 (illustrated in FIG. 1) or the forward-facing camera 172 (illustrated in FIG. 1) can be realized by the one or more cameras 1926.

The input system 1930 can include any device, component, system, element, arrangement, or groups thereof that enable information/data to be entered into a machine. The input system 1930 can receive an input from a vehicle passenger (e.g., a driver or a passenger). The output system 1935 can include any device, component, system, element, arrangement, or groups thereof that enable information/data to be presented to a vehicle passenger (e.g., a driver or a passenger).

Various examples of the one or more vehicle systems 1940 are illustrated in FIG. 19. However, one of skill in the art understands that the vehicle 1900 can include more, fewer, or different vehicle systems. Although particular vehicle systems can be separately defined, each or any of the systems or portions thereof may be otherwise combined or segregated via hardware and/or software within the vehicle 1900. For example, the one or more vehicle systems 1940 can include a propulsion system 1941, a braking system 1942, a steering system 1943, a throttle system 1944, a transmission system 1945, a signaling system 1946, and/or the navigation system 1947. Each of these systems can include one or more devices, components, and/or a combination thereof, now known or later developed.

The navigation system 1947 can include one or more devices, applications, and/or combinations thereof, now known or later developed, configured to determine the geographic location of the vehicle 1900 and/or to determine a travel route for the vehicle 1900. The navigation system 1947 can include one or more mapping applications to determine a travel route for the vehicle 1900. The navigation system 1947 can include a global positioning system, a local positioning system, a geolocation system, and/or a combination thereof.

The one or more actuators 1950 can be any element or combination of elements operable to modify, adjust, and/or alter one or more of the vehicle systems 1940 or components thereof responsive to receiving signals or other inputs from the one or more processors 1910 and/or the one or more automated driving modules 1960. Any suitable actuator can be used. For example, the one or more actuators 1950 can include motors, pneumatic actuators, hydraulic pistons, relays, solenoids, and/or piezoelectric actuators.

The one or more processors 1910 and/or the one or more automated driving modules 1960 can be operatively connected to communicate with the various vehicle systems 1940 and/or individual components thereof. For example, the one or more processors 1910 and/or the one or more automated driving modules 1960 can be in communication to send and/or receive information from the various vehicle systems 1940 to control the movement, speed, maneuvering, heading, direction, etc. of the vehicle 1900. The one or more processors 1910 and/or the one or more automated driving modules 1960 may control some or all of these vehicle systems 1940 and, thus, may be partially or fully automated.

The one or more processors 1910 and/or the one or more automated driving modules 1960 may be operable to control the navigation and/or maneuvering of the vehicle 1900 by controlling one or more of the vehicle systems 1940 and/or components thereof. For example, when operating in an automated mode, the one or more processors 1910 and/or the one or more automated driving modules 1960 can control the direction and/or speed of the vehicle 1900. The one or more processors 1910 and/or the one or more automated driving modules 1960 can cause the vehicle 1900 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 1970 can include one or more receivers 1971 and/or one or more transmitters 1972. The communications system 1970 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 1970 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V21) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies. For example, functions and/or operations of the communications device 174 (illustrated in FIG. 1), the communications device 176 (illustrated in FIG. 1), or the communications device 178 (illustrated in FIG. 1) can be realized by the communications system 1970.

Moreover, the one or more processors 1910, the one or more data stores 1915, and the communications system 1970 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 1900 can include one or more modules, at least some of which are described herein. The modules can be implemented as computer-readable program code that, when executed by the one or more processors 1910, implement one or more of the various processes described herein. One or more of the modules can be a component of the one or more processors 1910. Additionally or alternatively, one or more of the modules can be executed on and/or distributed among other processing systems to which the one or more processors 1910 can be operatively connected. The modules can include instructions (e.g., program logic) executable by the one or more processors 1910. Additionally or alternatively, the one or more data store 1915 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 1900 can include one or more automated driving modules 1960. The one or more automated driving modules 1960 can be configured to receive data from the sensor system 1920 and/or any other type of system capable of capturing information relating to the vehicle 1900 and/or the external environment of the vehicle 1900. In one or more arrangements, the one or more automated driving modules 1960 can use such data to generate one or more driving scene models. The one or more automated driving modules 1960 can determine position and velocity of the vehicle 1900. The one or more automated driving modules 1960 can determine the location of obstacles, obstacles, or other environmental features including traffic signs, trees, shrubs, neighboring vehicles, pedestrians, etc.

The one or more automated driving modules 1960 can be configured to receive and/or determine location information for obstacles within the external environment of the vehicle 1900 for use by the one or more processors 1910 and/or one or more of the modules described herein to estimate position and orientation of the vehicle 1900, vehicle position in global coordinates based on signals from a plurality of satellites, or any other data and/or signals that could be used to determine the current state of the vehicle 1900 or determine the position of the vehicle 1900 with respect to its environment for use in either creating a map or determining the position of the vehicle 1900 in respect to map data.

The one or more automated driving modules 1960 can be configured to determine one or more travel paths, current automated driving maneuvers for the vehicle 1900, future automated driving maneuvers and/or modifications to current automated driving maneuvers based on data acquired by the sensor system 1920, driving scene models, and/or data from any other suitable source such as determinations from the sensor data 1919. As used herein, "driving maneuver" can refer to one or more actions that affect the movement of a vehicle. Examples of driving maneuvers include: accelerating, decelerating, braking, turning, moving in a lateral direction of the vehicle 1900, changing travel lanes, merging into a travel lane, and/or reversing, just to name a few possibilities. The one or more automated driving modules 1960 can be configured to implement determined driving maneuvers. The one or more automated driving modules 1960 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 1960 can be configured to execute various vehicle functions and/or to transmit data to, receive data from, interact with, and/or control the vehicle 1900 or one or more systems thereof (e.g., one or more of vehicle systems 1940). For example, functions and/or operations of an automotive navigation system can be realized by the one or more automated driving modules 1960.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, 6A, 6B, 7-15, 16A-16D, and 17-19, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a processor; and a memory storing:

a production module including instructions that, when executed by the processor, cause the processor to produce, from data extracted from images of a location, a digital map, wherein the data, extracted from an image of the images, include information about:

a pose of a camera that produced the image, and at least one of a position of a point on:

a lane boundary of a lane of a road in the image, a road boundary of the road, or a landmark in the image, but exclude a depiction of any of the lane boundary, the road boundary, and the landmark; and a communications module including instructions that, when executed by the processor, cause the processor to transmit the digital map to a first vehicle to be used to control a movement of the first vehicle.

2. The system of claim 1, wherein the landmark comprises a sign.

3. The system of claim 2, wherein the information about the sign includes:

for a center of the sign, a latitude position, a longitude position, and an altitude, a height of the sign, and a width of the sign.

4. The system of claim 2, wherein the information about the sign includes information about a message communicated by the sign.

5. The system, of claim 1, wherein:

the instructions to produce the digital map include instructions to process, using at least one simultaneous localization and mapping technique, the data extracted from the images of the location, and the location is a specific region.

6. The system of claim 5, wherein a shape of the specific region is defined by seven regular hexagons arranged with one hexagon, of the seven regular hexagons, in a center position and another hexagon, of the seven regular hexagons, disposed on a side of the one hexagon.

7. The system of claim 1, wherein the communications module further includes instructions to receive, from at least one second vehicle, the data extracted from the images, wherein the camera comprises at least one camera, the at least one camera being attached to the at least one second vehicle.

8. The system of claim 7, wherein:

a camera, of the at least one camera, is attached to a vehicle of the at least one second vehicle, the instructions to receive include instructions to receive, from the vehicle of the at least one second vehicle and at a rate of once per thirty seconds, a transmission of a batch of the data extracted from the images produced by the camera, of the at least one camera, in a duration of time of thirty seconds, and the instructions to produce the digital map include:

instructions to group the images into keyframes, and instructions to process, using at least one simultaneous localization and mapping optimization technique, the keyframes.

9. The system of claim 8, wherein:

a first keyframe, of the keyframes, is characterized by a first measure, the first measure being of values of the data included in the first keyframe, a second keyframe, of the keyframes, is characterized by a second measure, the second measure being of values of the data included in the second keyframe, and a difference between the first measure and the second measure is greater than a threshold.

10. The system of claim 8, wherein a count of the images included in a keyframe, of the keyframes, is a function of a distance traveled by the vehicle of the at least one second vehicle.

11. The system of claim 1, wherein the production module includes an alignment submodule, the alignment submodule including instructions that, when executed by the processor, cause the processor to align the position of the point, affiliated with a production of a version of the digital map, with a position of a point in an aerial image of the location to produce an aerial image aligned digital map.

12. The system of claim 11, wherein the instructions to align include:

instructions to detect, within a first copy of the aerial image, indications of road boundaries on improved surfaces for use by vehicles and pedestrians;

instructions to cause each pixel, in the first copy of the aerial image, affiliated with the road boundaries to have a lowest value to produce a first modified aerial image;

instructions to cause all other pixels, in the first modified aerial image, to have a highest value;

instructions to determine, for a first pixel of the all other pixels, a first distance, the first distance being between a position at a location represented by a center of the first pixel and a position at a location represented by a nearest first pixel that has the lowest value; and instructions to change, as a first operation to produce a first segmentation mask, a value for the first pixel from the highest value to a first value that represents the first distance.

13. The system of claim 12, wherein:

the position of the point, affiliated with the production of the version of the digital map, is a position of a point on the road boundary and coincides with a position, on the first segmentation mask, of the first pixel, and the instructions to align further include instructions to cause, as an operation to produce the aerial image aligned digital map, the position of the point, affiliated with the production of the version of the digital map, to move by the first distance to a position that coincides with the position, on the first segmentation mask, of the nearest first pixel that has the lowest value.

14. The system of claim 12, wherein:

the first pixel, a second pixel of the all other pixels, a third pixel of the all other pixels, and a fourth pixel of the all other pixels are arranged in a configuration having two rows and two columns, and the instructions to align further include:

instructions to determine, for the second pixel, a second distance, the second distance being between a position at a location represented by a center of the second pixel and a position at a location represented by a nearest second pixel that has the lowest value;

instructions to change, as a second operation to produce the first segmentation mask, a value for the second pixel from the highest value to a second value that represents the second distance;

instructions to determine, for the third pixel, a third distance, the third distance being between a position at a location represented by a center of the third pixel and a position at a location represented by a nearest third pixel that has the lowest value;

instructions to change, as a third operation to produce the first segmentation mask, a value for the third pixel from the highest value to a third value that represents the third distance;

instructions to determine, for the fourth pixel, a fourth distance, the fourth distance being between a position at a location represented by a center of the fourth pixel and a position at a location represented by a nearest fourth pixel that has the lowest value;

instructions to change, as a fourth operation to produce the first segmentation mask, a value for the fourth pixel from the highest value to a fourth value that represents the fourth distance; and instructions to determine, as a fifth operation to produce the first segmentation mask, for a specific point within the first pixel, the second pixel, the third pixel, or the fourth pixel, and based on the first value, the second value, the third value, and the fourth value, a corresponding value that represents a corresponding distance between a position at a location represented by the specific point and a position at a location represented by a nearest corresponding pixel that has the lowest value.

15. The system of claim 11, wherein the instructions to align include:

instructions to detect, within the aerial image, indications of lane boundaries on improved surfaces for use by vehicles and pedestrians;

instructions to cause each pixel, in the aerial image, affiliated with the lane boundaries to have a lowest value to produce a modified aerial image;

instructions to cause all other pixels, in the modified aerial image, to have a highest value;

instructions to determine, for a pixel of the all other pixels, a distance, the distance being between a position at a location represented by a center of the pixel and a position at a location represented by a nearest pixel that has the lowest value; and instructions to change, as an operation to produce a segmentation mask, a value for the pixel from the highest value to a value that represents the distance.

16. The system of claim 15:

wherein the position of the point, affiliated with the production of the version of the digital map, is a position of a point on the lane boundary and coincides with the position, on the segmentation mask, of the pixel, and the instructions to align further include instructions to cause, as an operation to produce the aerial image aligned digital map, the position of the point, affiliated with the production of the version of the digital map, to move by the distance to a position that coincides with the position, on the segmentation mask, of the nearest pixel that has the lowest value.

17. A method, comprising:

producing, by a processor and from data extracted from images of a location, a digital map, wherein the data, extracted from an image of the images, include information about:

a pose of a camera that produced the image, and at least one of a position of a point on:

a lane boundary of a lane of a road in the image, a road boundary of the road, or a landmark in the image, but exclude a depiction of any of the lane boundary, the road boundary, and the landmark; and transmitting, by the processor, the digital map to a vehicle to be used to control a movement of the vehicle.

18. The method of claim 17, wherein the at least one of the position of the point on the lane boundary, the road boundary, or the landmark is affiliated with a position of a keypoint of an object, in the image, that represents the lane boundary, the road boundary, or the landmark.

19. The method of claim 17, wherein the producing the digital map comprises processing, using at least one data association technique, the data extracted from the images to determine correspondence of the position of the point extracted from a specific object, included in a first image of the images, with the position of the point extracted from the specific object included in a second image of the images.

20. A non-transitory computer-readable medium for producing, from data extracted from images of a location, a digital map, the non-transitory computer-readable medium including instructions that, when executed by one or more processors, cause the one or more processors to:

produce, from the data, the digital map, wherein the data, extracted from an image of the images, include information about:

a pose of a camera that produced the image, and at least one of a position of a point on:

a lane boundary of a lane of a road in the image, a road boundary of the road, or a landmark in the image, but exclude a depiction of any of the lane boundary, the road boundary, and the landmark; and transmit the digital map to a vehicle to be used to control a movement of the vehicle.

* * * * *